(12) United States Patent
Kim et al.

(10) Patent No.: US 9,849,464 B2
(45) Date of Patent: Dec. 26, 2017

(54) DEVICES AND METHODS FOR SPATIALLY AND TEMPORALLY RECONFIGURABLE ASSEMBLY OF COLLOIDAL CRYSTALS

(71) Applicant: THE REGENTS OF THE UNIVERSITY OF MICHIGAN, Ann Arbor, MI (US)

(72) Inventors: Youngri Kim, Ann Arbor, MI (US); Aayush Shah, Ann Arbor, MI (US); Michael J. Solomon, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 348 days.

(21) Appl. No.: 14/683,492

(22) Filed: Apr. 10, 2015

(65) Prior Publication Data

US 2015/0299881 A1    Oct. 22, 2015

Related U.S. Application Data

(60) Provisional application No. 61/981,503, filed on Apr. 18, 2014.

(51) Int. Cl.
*C25D 1/18* (2006.01)
*C25D 1/00* (2006.01)
(Continued)

(52) U.S. Cl.
CPC .................. *B03C 5/00* (2013.01); *G02F 1/00* (2013.01); *B82Y 20/00* (2013.01)

(58) Field of Classification Search
CPC .............. B03C 5/00; G02F 1/00; B82Y 20/00
See application file for complete search history.

(56) References Cited

U.S. PATENT DOCUMENTS 7,247,349 B2    7/2007   Ozin et al.
7,520,933 B2    4/2009   Park et al.
(Continued)

FOREIGN PATENT DOCUMENTS

CN       102558410 A      7/2012
WO         9740385 A1     10/1997
(Continued)

OTHER PUBLICATIONS

Crocker et al., "Methods of digital video microscopy for colloidal studies," J. of Colloid and Interface Science 179, pp. 298-310 (1996).
(Continued)

*Primary Examiner* — Gurpreet Kaur
(74) *Attorney, Agent, or Firm* — Harness, Dickey & Pierce, P.L.C.

(57) ABSTRACT

The disclosure provides devices and methods for controlled assembly of colloidal particles. A medium with colloidal particles having a charged surface is placed in physical contact with an electrically conductive material (e.g., an ITO coating). An external light source directs light towards the electrically conductive material, thus driving the colloidal particles from a first non-assembled state to a second assembled state, which may thus create organized colloidal crystals or alternatively predetermined void regions. Assembly of the colloids can be achieved with no external electric fields or external magnetic fields. Moreover, the colloidal assembly is three-dimensional, occurs rapidly, and is entirely reversible and reconfigurable based on controlling the light applied to the electrically conductive material.

23 Claims, 11 Drawing Sheets

(51) Int. Cl.
*B03C 5/00* (2006.01)
*G02F 1/00* (2006.01)
*B82Y 20/00* (2011.01)

(56) References Cited

U.S. PATENT DOCUMENTS

| | | | |
|---|---|---|---|
| 7,704,320 | B2 | 4/2010 | Marr et al. |
| 8,206,469 | B2 | 6/2012 | Chiang et al. |
| 2001/0035340 | A1* | 11/2001 | Hayward .............. C30B 5/00 204/157.15 |
| 2002/0045030 | A1 | 4/2002 | Ozin et al. |
| 2005/0250158 | A1 | 11/2005 | Parikh et al. |
| 2005/0272214 | A1 | 12/2005 | Chiang et al. |
| 2007/0134420 | A1 | 6/2007 | Koberstein et al. |
| 2011/0123803 | A1 | 5/2011 | Yamanaka et al. |
| 2012/0135237 | A1 | 5/2012 | Gracias et al. |

FOREIGN PATENT DOCUMENTS

| | | |
|---|---|---|
| WO | 0021905 A1 | 4/2000 |
| WO | 02091028 A2 | 11/2002 |
| WO | 2005047575 A1 | 5/2005 |
| WO | 2005062091 A2 | 7/2005 |
| WO | 2005066672 A1 | 7/2005 |
| WO | 2005084369 A2 | 9/2005 |
| WO | 2005089129 A2 | 9/2005 |

OTHER PUBLICATIONS

Dibble et al., "Structure and dynamics of colloidal depletion gels: Coincidence of transitions and heterogeneity," Physical Review E, 74 (1), p. 041403 (2006).
Russel et al., W. R. Chapter 12 in Colloidal dispersions, pp. 414-417 (1989).
Shah et al., "Liquid Crystal Order in Colloidal Suspensions of Spheroidal Particles by Direct Current Electric Field Assembly," Small vol. 8, pp. 1551-1562 (2012).
O'Brien, et al. "Electrophoretic mobility of a spherical colloidal particle," J. Chem. Soc. Faraday Trans. 2 vol. 74, pp. 1607-1626 (1978).
George et al. "Direct Laser Writing of Photoresponsive Colloids for Microscale Patterning of 3D Porous Structures." Advance Materials. vol. 21. pp. 66-70 (2009).
Grzelczak et al. "Directed Self-Assembly of Nanoparticles." ACS Nano. vol. 4. No. 7. pp. 3591-3605 (2010).
Hayward et al. "Electrophoretic Assembly of Colloidal Crystals with Optically Tunable Micropatterns." Nature. vol. 404. pp. 56-59 (2000).
Klajn et al. "Light-controlled Self-Assembly of Reversible and Irreversible Nanoparticle Suprastructures." PNAS. vol. 104. No. 25. pp. 10305-10309 (2007).
Kumar et al. "Optically Modulated Electrokinetic Manipulation and Concentration of Colloidal Particles near an Electrode Surface." Langmuir. vol. 26. No. 7. pp. 5262-5272 (2010).
Vossen et al. "Optical Tweezers and Confocal Microscopy for Simultaneous Three-Dimensional Manipulation and Imaging in Concentrated Colloidal Dispersions." American Insitute of Physics. vol. 75. No. 9. pp. 2960-2970 (2004).
Ma et al. "Formation of colloidal molecules induced by alternating-current electric fields." Journal of the American Chemical Society, 135, 7839-7842 (2013).
GE Fernandes, et al. "Spatially controlled reversible colloidal self-assembly." The Journal of Chemical Physics, 131, 134705 (2009).
Tierno. "Magnetically reconfigureable colloidal patterns arranged from arrays of self-assembled microscopic dimers." Soft Matter, 8, 11443-11446 (2012).
Smalyukh. "Optical control of reconfigurable shape-morphing liquid crystal elastomeric colloids in nematic and cholesteric liquid crystals" 245th National Spring Meeting f the ACS (Apr. 2013).
Yang, et al. "A family of electronically reconfigurable nanodevices." Advanced Materials, 21, 3754-3758 (2009).

* cited by examiner

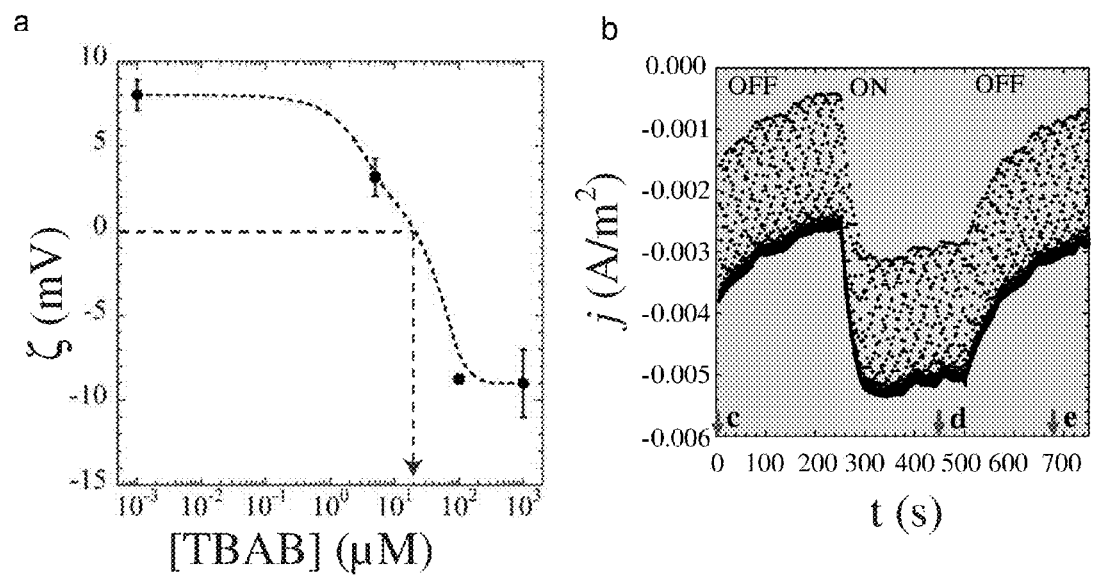
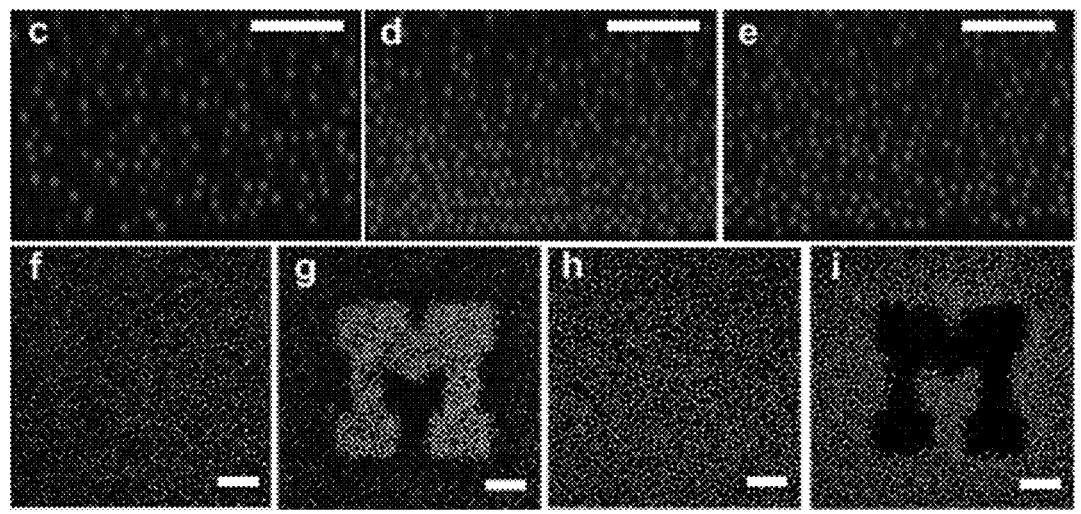
FIGS. 7A – 7I

DEVICES AND METHODS FOR SPATIALLY AND TEMPORALLY RECONFIGURABLE ASSEMBLY OF COLLOIDAL CRYSTALS

CROSS-REFERENCE TO RELATED APPLICATIONS

This application claims the benefit of U.S. Provisional Application No. 61/981,503, filed on Apr. 18, 2014. The entire disclosure of the above application is incorporated herein by reference.

GOVERNMENT RIGHTS

This invention is made with government support under W911NF-10-1-0518 awarded by the U.S. Army/Army Research Office. The Government has certain rights in the invention.

FIELD

The present disclosure relates to devices and methods for reversible and reconfigurable spatial and temporal assembly of colloidal crystals driven by light induced movement.

BACKGROUND

This section provides background information related to the present disclosure which is not necessarily prior art. Colloidal crystal assemblies are used for various applications, including in sensors, optics, and communications, by way of non-limiting example. Colloid crystal assemblies are important for various micro-engineering applications, like the design of optical and optoelectronic components (e.g., polarizers, waveguides, filters, and photonic circuits), nanoporous templates for applications in separation, filtration, and sensing, and as photonic transducers of chemical and biological signals. However, the ability to control organization and assembly of colloidal crystals is important to the production and utilization of various materials with functional optical, mechanical, and/or conductive properties.

While colloid particles may self-assemble into crystals naturally, such processes are slow (e.g., limited by their slow kinetics) and lack the ability to manipulate and control the structures in space and time. Conventional directed assembly processes for organizing and assembling colloids afford more control and partially address the problem of self-assembly, with the use of gravitational, electrical and/or magnetic fields or templating, but such processes are limited by their confinement to two-dimensional (2D) colloid assemblies and lack of reconfigurability or reversibility due to the reliance on templates and fixed surface features. Recent efforts to produce reconfigurable colloidal assemblies have included holographic optical tweezers, optically tunable electrophoretic and electrokinetic assemblies, photoresponsive colloids and DNA directed assembly.

However, such conventional colloid assembly methods have been limited by their requirement for complex optics (e.g., holographic optical tweezers), confinement to 2D assemblies (e.g., directed assembly by DNA-linked colloids), or lack of reversibility (e.g., photoresponsive colloids) and spatial reconfigurability due to fixed templates and surface features (e.g., dielectrophoresis). A template-free method also providing the ability to reversibly control and reconfigure colloidal crystals simultaneously in three-dimensional space and time, without any need for electrode pairs, would be particularly advantageous. Likewise, it would be desirable for various applications, including adaptive optics or reconfigurable circuit elements with conductive functionalities, to provide devices and methods of assembly in which three-dimensional (3D) colloidal crystals could not only be reversibly switched on and off in time, but can also be simultaneously controlled and manipulated in space, on the micrometer scale, without the restriction of fixed surface features such as electrodes and templates.

SUMMARY

This section provides a general summary of the disclosure, and is not a comprehensive disclosure of its full scope or all of its features.

In various aspects, the present disclosure contemplates methods and devices for controlling assembly of colloidal particles. For example, a device for controlled assembly of colloidal particles in certain variations may comprise an electrically conductive material and a medium comprising a plurality of colloidal particles having a charged surface. The medium is in contact with the electrically conductive material. An external light source directs light towards the electrically conductive material. In the absence of the light, the plurality of colloidal particles is in a first non-assembled state. When the external light source is activated to generate the light, the plurality of colloidal particles is reversibly driven into a second assembled state. The second assembled state may define a region concentrated with the plurality of colloidal particles. In other aspects, the second assembled state may define a region substantially depleted of the plurality of colloidal particles. In certain variations, the device has no external electric fields or external magnetic fields.

In other variations, the present disclosure contemplates methods for making a device for controlled assembly of colloidal particles. The method comprises disposing a medium comprising a plurality of colloidal particles having a charged surface in contact with an electrically conductive material capable of receiving light from an external light source to form the device. The plurality of colloidal particles in the device can thus be reversibly driven from a first non-assembled state to a second assembled state when the light is activated from the external light source and directed to the electrically conductive material. The second assembled state may define a region concentrated with the plurality of colloidal particles. In other aspects, the second assembled state may define a region substantially depleted of the plurality of colloidal particles. The transition from the first non-assembled state to the second assembled state is reversible. In certain aspects, such a transition occurs without any external electric fields or external magnetic fields.

In yet other variations, the present disclosure provides a method of making a device for controlled assembly of colloidal particles. The method comprises disposing a medium comprising a plurality of colloidal particles having a charged surface in contact with an electrically conductive material to create the device. The medium optionally has a dielectric constant of less than about 80. In certain aspects, the charged surface of the colloidal particle may have a ζ-potential of greater than or equal to about −100 mV to less than or equal to about 100 mV and in certain variations, optionally greater than or equal to about −20 mV to less than or equal to about 20 mV. The device is configured to receive light from an external light source, so that in the absence of the light, the plurality of colloidal particles are in a first non-assembled state and in the presence of the light, the plurality of colloidal particles are reversibly driven into a second assembled state. The second assembled state may define a region concentrated with the plurality of colloidal particles. In other aspects, the second assembled state may define a region substantially depleted of the plurality of colloidal particles. In certain variations, the device has no external electric fields or external magnetic fields.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
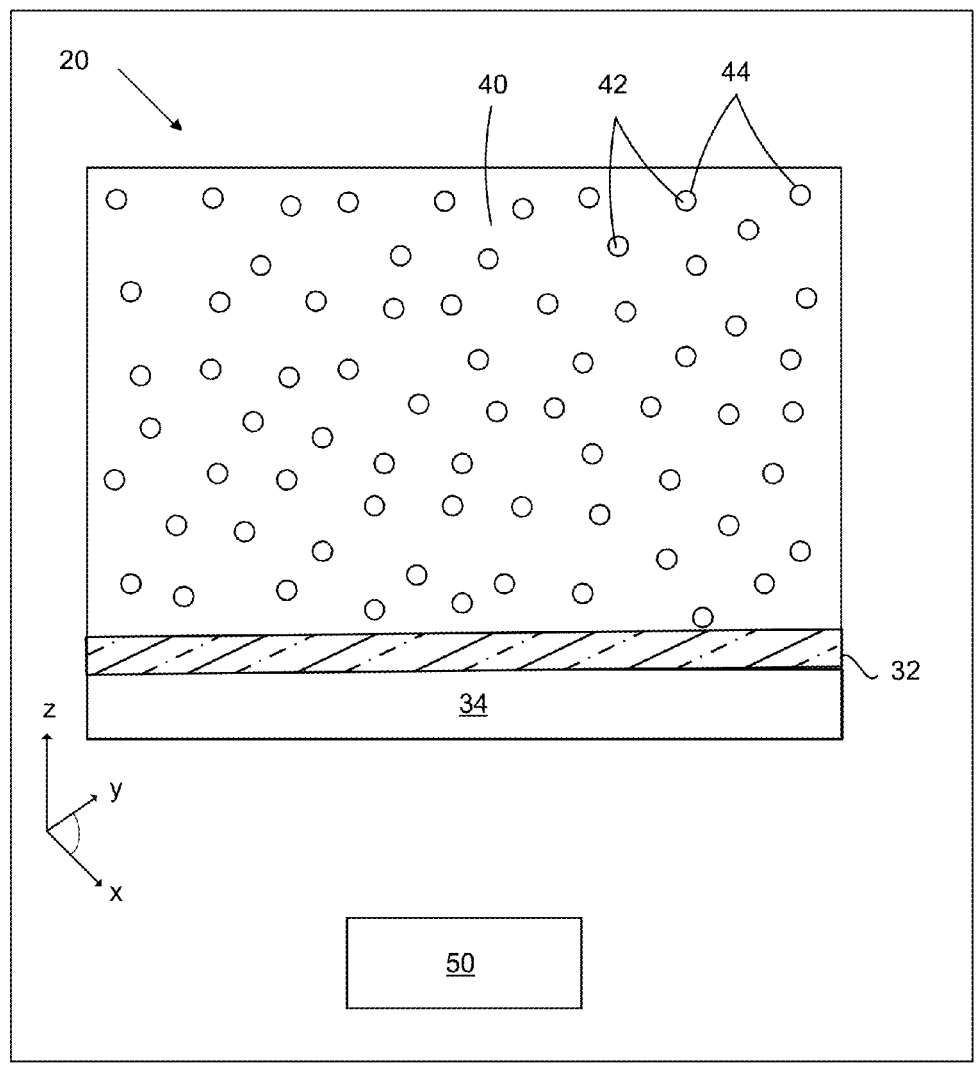
FIG. 1 shows an exemplary schematic of a device prepared in accordance with certain aspects of the present disclosure having a light source in a deactivated state and a colloidal particle system in a first unassembled state.

FIGS. 3A-3M show photo-induced colloidal assembly phenomenon. (3A) 1.4 μm PHSA-stabilized PMMA colloids at an initial volume fraction of 0.05 are initially dispersed in solution in contact with the ITO coated glass substrate. (3B) A 488 nm laser or UV light source shown as cone structure is focused and scanned across a region of interest. (3C) Particle accumulation is observed at the illuminated region. (3D-3M) Each image pair shows the colloidal structure before and after 60 seconds of excitation with light having a wavelength of 488 nm with power density 12 W cm$^{-2}$ (3D-3K) and excitation with light having a wavelength of 360 nm with power density 0.62 W cm$^{-2}$ (3L-3M). The solvent is CHB/decalin with 50 μM TBAB added (3D-3I, 3L-3M) or no added TBAB (3J-3K). In images (3D-3E, 3J-3K, 3L-3M), the solution is in contact with an ITO coated substrate; (3F-3G) the solution is in contact with a gold coated substrate; (3H-3I) is a control experiment in which the solution is in contact with a pure silica substrate. Scale bars are 20 μm.

FIGS. 4A-4E shows three-dimensional structures of the photo-induced assembly. The particle and solvent conditions are as in FIG. 3E and the illumination time is 120 seconds. (4A) Image perpendicular to the ITO coverslip shows accumulation of multiple layers of colloids above the region of illumination. Scale bar is 5 μm. (4B) Image of the same structure acquired at the ITO coverslip. Scale bar is 5 μm. (4C) Three-dimensional (3D) rendering of CLSM-derived colloid centroids shows crystalline structure; colloid centroids are identified by image processing; (4D) Rendering of the crystalline layer closest to the cover slip, which shows hexagonal ordering, with some minor defect structure. (4E) Particle number density (N/V) of the assembly is a function of distance from the substrate and laser power density.

FIGS. 5A-5H shows kinetics of assembly under optical field excitation. (5A-5F) Time lapse images of PMMA particles ($\phi_0$=0.05) concentrating in the 25×25 μm$^2$ region that is illuminated. The particle and solvent conditions are as in FIG. 4E. Scale bar is 5 μm. (5G) Particle volume fraction, $\phi$, monotonically increases until it reaches steady-state. (5H) Quantification of the critical concentration time, $t_c$, shows that time for accumulation decreases with increasing laser power density and initial volume fraction. The error bars indicate standard deviation.

FIGS. 6A-6H show the influence of an electrolyte tetrabutylammonium bromide (TBAB) concentration on the photoinduced effect. Images are acquired 150 seconds after illumination and the initial colloid volume fraction is 0.05. For these colloids, the particle zeta potential ($\zeta$) is a known function of TBAB concentration. (6A-6C) Images show PMMA colloid migration away from the illuminated region, thereby generating a void region of low colloid concentration. (6D-6F) Images show PMMA colloid migration toward the illuminated region, thereby leading to concentration and assembly. Scale bar is 5 μm. (6G) For TBAB concentrations under 7.5 μM, $\phi$ decreases from its initial volume fraction, indicating depletion of particles within the region of interest. Above 7.5 μM TBAB, the volume fraction increases monotonically to a higher final volume fraction. (6H) Final volume fraction values are extracted from (6G) and plotted against their TBAB concentrations. There is a distinct transition between 7.5 μM and 8.75 μM TBAB; depletion is observed below this transition and assembly is observed above. The error bars indicate standard deviation.

FIGS. 7A-7I shows electrophoretic origin of the photoinduced assembly mechanism. (7A) Zeta potential values of PHSA stabilized PMMA colloids undergo a change in sign at about 20 μM added TBAB. The dotted curve is a line to guide the eye. The error bars indicate standard deviation. (7B) when the photoinduced effect is generated in a cell with electrodes, the measured current exhibits a rapid change as a direct response of the UV light being turned on and off. This experiment is carried out with PHSA stabilized PMMA colloids prepared at 5% volume fraction and 1000 μM concentration of TBAB. (7C-7E) CLSM images corresponding to the times marked in (7B) (at 0 seconds, approximately 450 seconds, and approximately 680 seconds). Images taken perpendicular to the cover slip show that the effect of light on the particle assembly is temporally correlated with changes in current density due to the illumination. Scale bar is 15 μm. (7F-7I) Because the current density is produced only in the illuminated region, the photo-induced assembly and depletion effects can be achieved when complex shapes are illuminated by the light, as is possible by, for example, using the optics of the scanning microscope. (7F-7G) Before and after images of colloidal assembly show accumulation of particles in the illuminated region having a complex shape. The colloidal solution is prepared at 5% initial volume fraction with 1000 μM TBAB in CHB/decalin. (7H-7I) Before and after images of colloidal depletion show depletion of particles within the illuminated region of complex shape. The initial colloidal volume fraction is 10% and the solvent is pure CHB/decalin. Scale bars are 20 μm.

Figure 8:
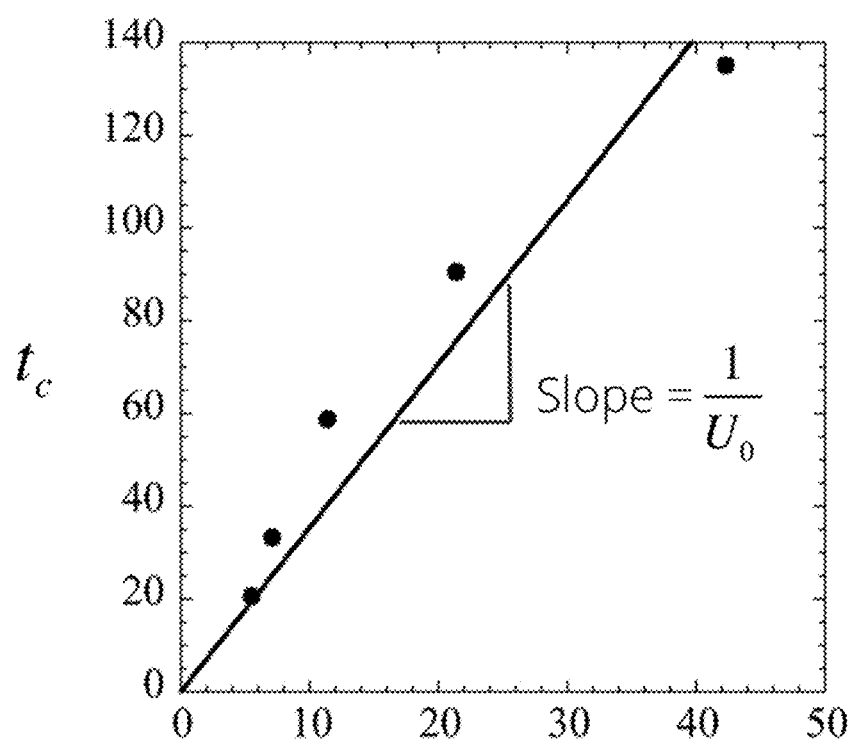

FIG. 8 shows an analysis of Equation 1 and data of FIGS. 5A-5H used to infer the velocity of colloids induced by the illumination with visible light. The accumulation times of experiments prepared at five different initial volume fractions (0.0125, 0.025, 0.05, 0.10, 0.20) are plotted against parameters given. Solutions are prepared at 1000 μM TBAB concentration. The slope of 3.51±0.29 is inversely related to the colloidal velocity.

Figure 9:
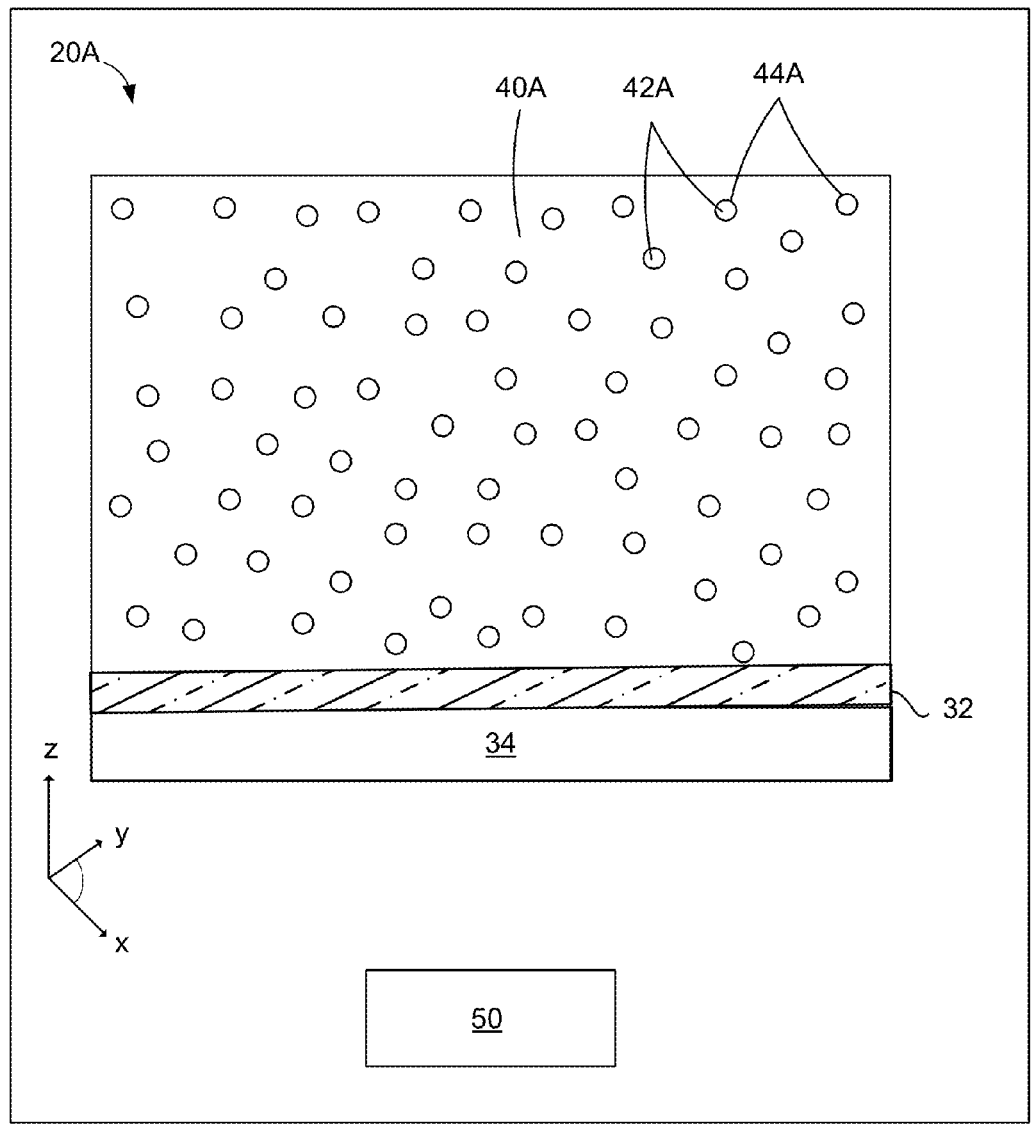

FIG. 9 shows an exemplary schematic of a device prepared in accordance with certain aspects of the present disclosure having a light source in a deactivated state and a colloidal particle system in a first unassembled state.

Figure 10:
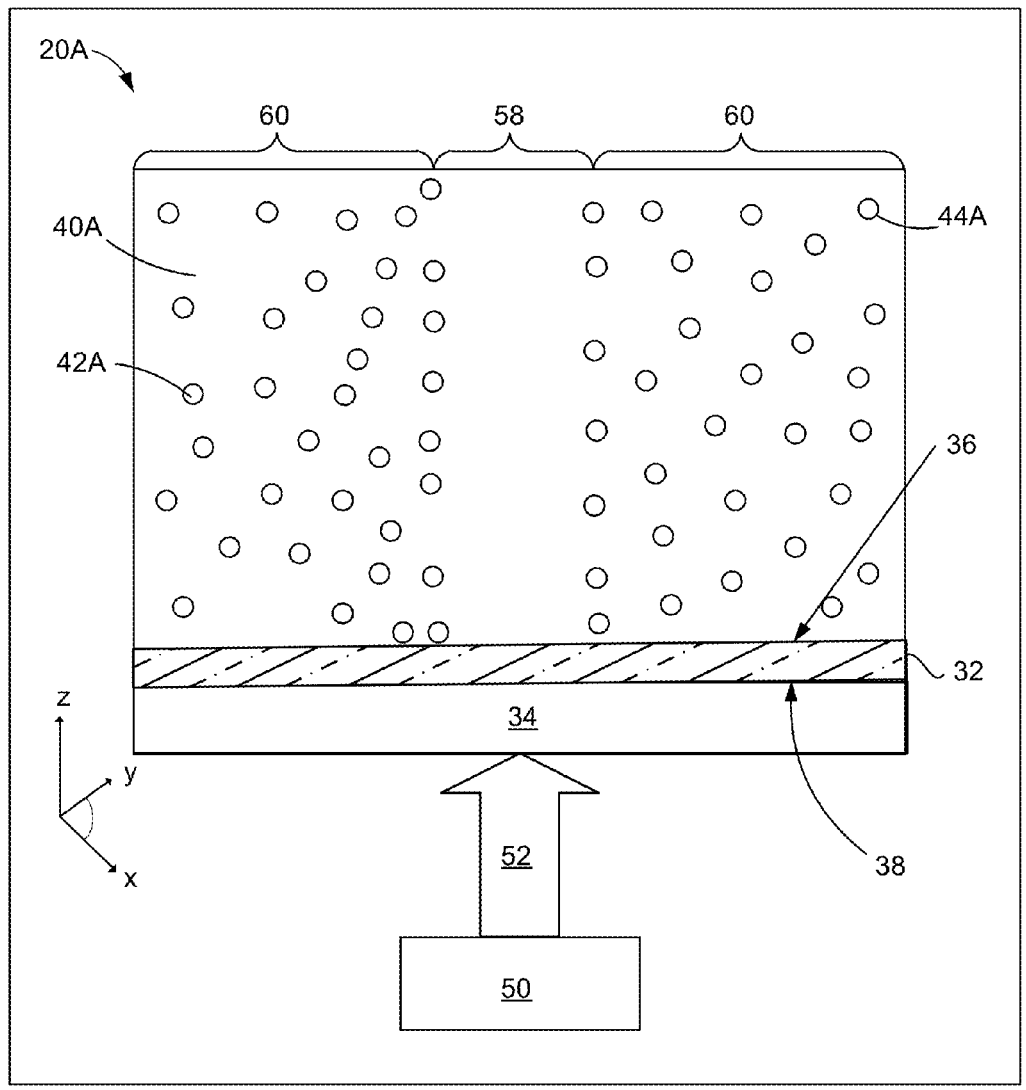

FIG. 10 shows an exemplary schematic of the device in FIG. 9 having the light source in an activated state and a colloidal particle system in a photoinduced second state, defining a region where the plurality of colloidal particles are substantially depleted corresponding to where light is directed.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges. Example embodiments will now be described more fully with reference to the accompanying drawings.

The present technology pertains to colloidal systems. A colloid is a system with a dispersed phase and a continuous phase, where the dispersed phase may be evenly or homogenously distributed in the continuous phase or medium. The substance or material in the dispersed phase is typically larger than a single molecule, but smaller than can be observed with the visible eye. The dispersed phase may be a liquid, semi-liquid, solid, or gas. In preferred aspects of the present disclosure, the dispersed phase is a solid, such as a particle (referred to herein as a "colloidal particle"). In certain aspects, the dispersed solid phase comprises a colloidal particle having an average particle size diameter of greater than or equal to about 1 nm to less than or equal to about 10 μm and in certain aspects, optionally greater than or equal to about 500 nm to less than or equal to about 2 μm (2,000 nm).

Colloidal particles can be assembled to form a colloidal crystal structure. Certain colloidal crystal structures are formed by electrostatic interaction acting between particles in a dispersion system (charged colloidal system) of charged colloidal particles. For example, a crystal is formed by a colloidal system obtained by dispersing silica particles ($SiO_2$) or other particles comprising a polymer (e.g., polystyrene, poly(methyl methacrylate), and the like) having a surface with a dissociable group into a polar medium, such as water. Electrostatic interaction between particles can result in self-assembly and formation of colloidal crystals from such systems.

With the present technology, functional properties of three-dimensional (3D) colloidal crystals useful for various applications, such as sensing, communication, photoresponsive materials, and circuit elements, can be readily controlled and rapidly reconfigured in time and space, without the constraints on control imposed by conventional methods. For this reason, the present technology represents a new kind of template-free, reconfigurable photolithography of 3D colloidal crystals. In various aspects, the new assembly methods according to certain aspects of the present disclosure do not require application of external fields (e.g., electric or magnetic), do not require complex optics, are not confined to two-dimensional (2D) assemblies, but rather enable control over three-dimensional (3D) assemblies, with rapid assembly that is fully reversible and reconfigurable in space and time.

Figure 2:
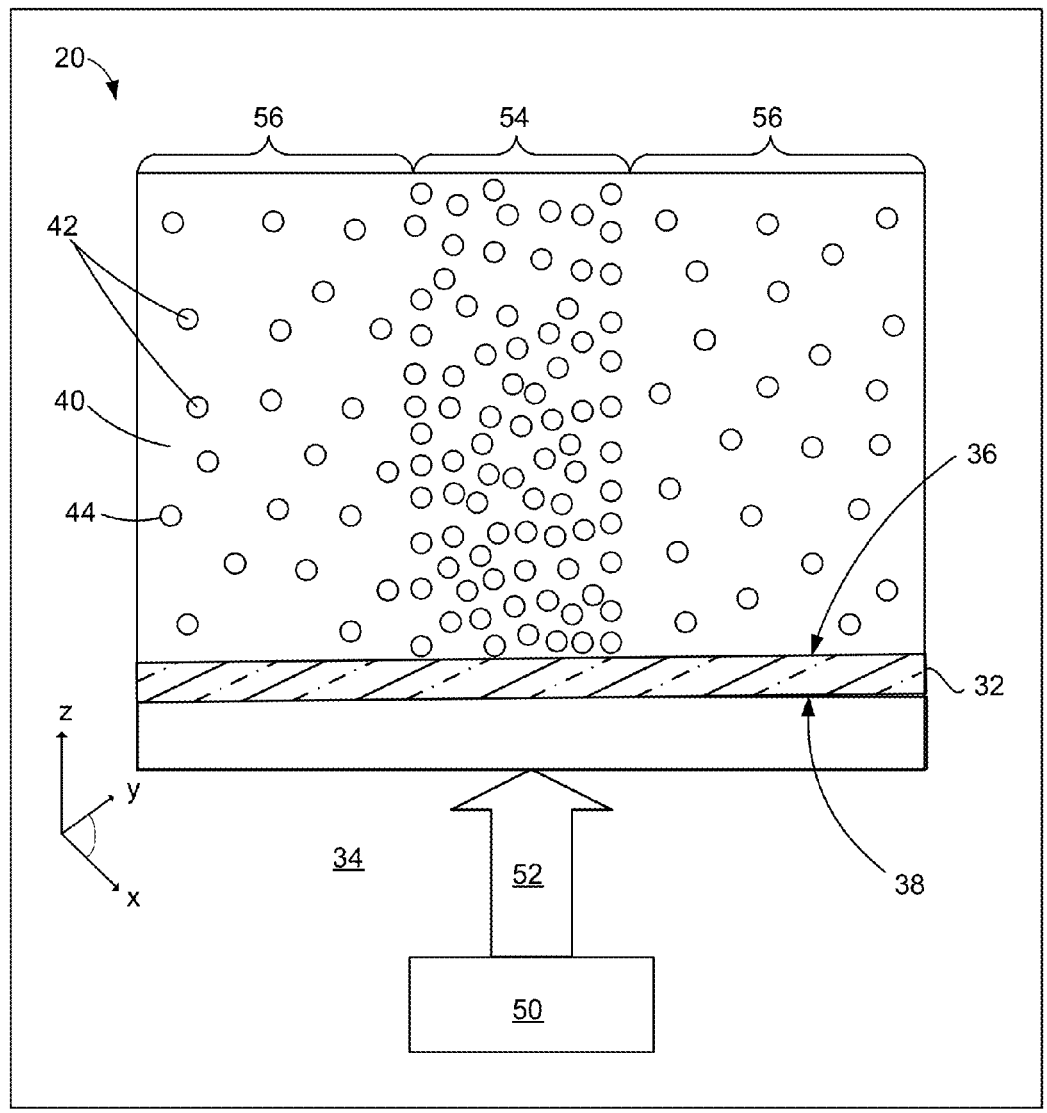
FIG. 2 shows an exemplary schematic of the device in FIG. 1 having the light source in an activated state and a colloidal particle system in a photoinduced second assembled state, where the plurality of colloidal particles are concentrated in a region corresponding to where light is directed.

As shown in FIGS. 1 and 2, the present disclosure provides a device 20 for controlled assembly of colloidal particles. Such control may include not only two-dimensional (2D) control, but also three-dimensional (3D) control of the colloidal particles in the system (x, y, and z axes are shown in FIGS. 1 and 2). The device 20 includes an electrically conductive material 32 that coats a portion of a substrate 34. Notably, the electrically conductive material 32 may be a coating in certain preferred aspects, but may also be a separate layer or distinct structure not requiring a substrate 34. A medium 40 comprises a plurality of colloidal particles 42. The plurality of colloidal particles 42 each respectively has a charged surface 44. Notably, the plurality of colloidal particles 42 may comprise a single species or multiple distinct species. The medium 40 is in physical contact with at least one region of the electrically conductive material 32. The substrate 34 may be planar or alternatively may contain or hold the medium 40 and colloidal particles 42. The device 20 also includes a light source 50 (e.g., an external light source) that directs light 52 (e.g., electromagnetic radiation or energy) when activated towards the electrically conductive material 32. As shown, substrate 34 is transmissive to light 52 generated by the light source 50.

Notably, the device 20 is not limited in number or placement of the components as shown in FIGS. 1 and 2, so that it may include additional light sources or different placement of the light source, or may include a different configuration or placement of electrically conductive material (e.g., on side or top walls). However, in various aspects, the medium 40 is desirably in contact with the electrically conductive material 32 on a first side 36, while light 52 is directed to a second opposite side 38 of the electrically conductive material 32 to enable photoinduced assembly of the colloidal particles 42.

FIG. 1 shows a first state of the colloidal system (medium 40 and colloidal particles 42) in the absence of light from the light source 50, where the plurality of colloidal particles 42 is in a first non-assembled, distributed, and unorganized state. When the light source 50 is activated to generate the light 52 as shown in FIG. 2, the plurality of colloidal particles 42 are reversibly driven into a second assembled state, where the colloidal particles 42 are organized spatially (in three dimensions, x, y, and z) by the presence of generated light 52.

Thus, aside from the light source 50, in certain preferred variations, the device 20 has no external energy or force fields, like external electric fields, power sources, or external magnetic fields, which are conventionally used as a primary means to control assembly of colloidal particles in a colloidal system. Notably, while it is preferred that only light 52 is used to assembly colloidal particles in accordance with the present technology, in certain alternative variations, light could be combined with other external energy fields for colloidal particle assembly. Likewise, the present teachings do not require any templating. Such a device for controlled colloid assembly does not require complex optics, is not confined to mere 2D assemblies, and is reversible and reconfigurable in space and time.

A photoinduced assembly method according to certain aspects of the present teachings yields regions in the medium 40 that are either concentrated with colloidal particles/crystals 42, or in certain alternative variations, may be depleted or devoid of colloid particles 42. By way of example, in FIG. 2 in the assembled state where light 52 is actively directed to the electrically conductive material 32, a first region 54 is concentrated with colloidal particles 42 in an organized and assembled form. The first region 54, concentrated with colloidal particles 42, corresponds to where light 52 is directed at the electrically conductive material 32, which attracts colloidal particles 42 to the first region 54. However, a second region 56 (outside of the first region 54 where light 52 is directed) has a concentration of colloidal particles 42 in the medium 40 that remains substantially similar to the concentration of colloidal particles 42 in the unassembled state. In other words, in the second region 56 outside the illuminated region, the concentration of colloidal particles 42 in the medium 40 remains close to an initial volume fraction in the unassembled state in the absence of any light.

By "non-assembled" state, it is meant that the colloidal particles are widely distributed throughout the medium, which may include either homogeneously or randomly distributed particles. In the non-assembled state, the colloidal particles are not crystallized or in other highly organized spatial arrangements. By "assembled" state it is meant that the colloidal particles are selectively concentrated and/or depleted and in one or more select regions of the medium. In certain aspects, the colloidal particles are highly organized in the assembled state, thus forming an array of evenly and/or regularly spaced colloidal particles. Such regularly spaced colloidal particles may thus define a colloidal crystal structure, for example, having uniform structural and photonic properties. Thus, in an assembled state in accordance with certain variations of the present disclosure, a region is defined that is concentrated with colloidal particles. In other alternative variations, in the assembled state, a region is defined that is substantially depleted of colloidal particles.

By a "concentrated" region, in certain aspects, it is meant that a region of the system has greater than or equal to about 10% by volume of colloidal particles in a total volume of medium and colloidal particles, optionally greater than or equal to about 20% by volume, optionally greater than or equal to about 30% by volume, optionally greater than or equal to about 40% by volume, and in certain variations, optionally greater than or equal to about 50% by volume of the colloidal particles in a total volume of medium and colloidal particles.

By "substantially depleted" region, in certain aspects, it is meant that a region in the system has less than or equal to about 20% by volume of colloidal particles a total volume of medium and colloidal particles, optionally less than or equal to about 10% by volume, optionally less than or equal to about 5% by volume, optionally less than or equal to about 2.5% by volume, optionally less than or equal to about 1% by volume, and in certain variations, optionally less than or equal to about 0.5% by volume of the colloidal particles a total volume of medium and colloidal particles.

An alternative embodiment of a device 20A is shown in FIGS. 9 and 10. To the extent that the components in the device are the same as previously described for FIGS. 1 and 2, for brevity, the discussion of these components will not be repeated herein unless otherwise indicated. A medium 40A comprises a plurality of colloidal particles 42A. The plurality of colloidal particles 42A each respectively has a charged surface 44A. Again, the plurality of colloidal particles 42A may comprise a single species or multiple distinct species. The medium 40A and/or colloidal particles 42A may have distinct zeta ($\zeta$) potential or charges from the medium 40 and colloidal 42 in FIGS. 1 and 2.

FIG. 9 shows a first state of the colloidal system (medium 40A and colloidal particles 42A) in the absence of light from the light source 50, where the plurality of colloidal particles 42A are in a first non-assembled, distributed, and unorganized state. When the light source 50 is activated to generate the light 52 as shown in FIG. 10, the plurality of colloidal particles 42A are reversibly driven into a second assembled state, where the colloidal particles 42A are organized spatially (in three dimensions, x, y, and z) by the presence of generated light 52. In FIG. 9, the spatial organization results in a first region 58 corresponding to where light 52 is actively directed to the electrically conductive material 32. The first region 58 is substantially depleted of any colloidal particles 42A and thus comprises mainly medium 40A. Thus, in contrast to the photoinduced mechanism in the embodiments of FIGS. 1 and 2, light 52 directed at the electrically conductive material 32 repels colloidal particles 42A. This opposite effect can be achieved by changing the surface charge 44A of the colloidal particles 42A from the surface charge 44 of colloidal particles 42 and thus generating a void region corresponding to illumination (rather than a concentrated region). A second region 60 outside of the first region 58 (where light 52 is directed) has a concentration of colloidal particles 42A in the medium 40A that is slightly increased from the concentration of colloidal particles 42A in the unassembled state as discussed above.

In certain aspects for certain colloidal particle and medium systems, whether the light 52 directed at electrically conductive material 32 attracts or repels colloidal particles (e.g., 42 or 42A) depends upon the zeta ($\zeta$) potential of the colloidal particles and medium, which can be controlled by either surface modification of the colloidal particles and/or selection of solvents and/or electrolytes or by otherwise adjusting the properties of the medium, as will be discussed in greater detail below. Aside from the light source 50, in certain preferred variations, the device 20A has no external energy or force fields, like external electric fields, power sources, or external magnetic fields, which are conventionally used as a primary means to control assembly of colloidal particles in a colloidal system.

In certain aspects, the devices and methods of the present disclosure provide high resolution and selective spatial features, meaning that the boundary regions between the first region and second regions (e.g., either a boundary of a first concentrated region 54 of assembled colloidal particles 42A and second region 56 as in FIG. 2 or alternatively a boundary of a first substantially depleted region 58 and a second region 60 as in FIG. 10) are well defined. Thus, in certain aspects, the transition between regions or boundary region may be less than or equal to about 100 nm, optionally less than or equal to about 50 nm, optionally less than or equal to about 40 nm, optionally less than or equal to about 30 nm, optionally less than or equal to about 20 nm, and in certain variations, may be about 10 nm (or 100 Angstroms (Å)).

Light is an effective means for controlling of colloidal crystals in space and time in accordance with the present technology, because its propagation can be readily controlled, for example, manipulated by commonly available microscope optics or by use of a standard lamp. It is believed that the ability to control assembly and migration of colloid particles is due to an electrophoresis effect that occurs by photochemistry at the conductive material. The effect of light on colloid particles in accordance with various aspects of the inventive technology is believed to be due to radiation pressure, especially for a system with a mismatch between particle and solvent refractive index. While not limiting the inventive technology to any particular theory, it appears that light can control the rate of chemical reaction between molecules in the medium and the electrically conductive material, and therefore is believed to induce localized ion flow due to a spatial concentration gradient of reactants. These ion flows are believed to create non-local electric fields that electrophoretically assemble colloids (having charged surfaces) and thus provide their light-induced organization. Therefore, photoinduced assembly occurring in accordance with various aspects of the present disclosure is believed due to an internal electric field generated by a light-induced current via interaction of light with the electrically conductive material. However, no external force fields (e.g., an electric field generated between two electrodes) are necessary to achieve the assembly and organization of colloidal particles.

Moreover, the use of light in accordance with the present teachings does not appreciable heat the medium. In certain variations, when light is activated and directed at the electrically conductive material, the medium exhibits a change in temperature of less than or equal to about 1° C., optionally less than or equal to about ½° C., and in certain aspects, exhibits a change in temperature of optionally less than or equal to about ⅒° C. In conventional systems, the application of external energy or magnetic fields can cause significant temperature differences that can cause volatilization of the medium or other destabilization of the system. Therefore, techniques in accordance with the present disclosure permit simple optical manipulations, enabling the reversible reconfiguration of the assembly of colloids into concentrated and/or depleted regions. Thus, the present technology provides a novel, template-free, reversible three-dimensional photo assembly device.

In various aspects, the plurality of colloidal particles compatible for use in the systems, devices, and methods of the present disclosure have a surface charge. Zeta potential ($\zeta$) or electrokinetic potential can be an important parameter for migration or stability in colloidal systems to facilitate assembly and organization. For example, in certain systems, the colloidal particle species has a zeta potential ($\zeta$) of greater than or equal to about −100 mV to less than or equal to about 100 mV, optionally greater than or equal to about −50 mV to less than or equal to about 50 mV, optionally greater than or equal to about −20 mV to less than or equal to about 20 mV, optionally greater than or equal to about −15 mV to less than or equal to about 15 mV, optionally greater than or equal to about −10 mV to less than or equal to about 10 mV, optionally greater than or equal to about −5 mV to less than or equal to about 10 mV, optionally greater than or equal to about −5 mV to less than or equal to about 5 mV, and in certain aspects, optionally greater than or equal to about 0 mV to less than or equal to about 10 mV.

In certain aspects, the plurality of colloidal particles comprises a colloidal particle having such a surface charge or zeta potential, which may be selected from the group consisting of: polymeric colloidal particles, inorganic colloidal particles, metal colloidal particles, semiconductor colloidal particles, ceramic colloidal particles, and combinations thereof. Suitable colloidal particles of any shape can be used. Useful colloids made from inorganic substances may comprise silica ($SiO_2$) or alumina ($Al_2O_3$) for example, as well as metals such as transition metals, conductors, and semiconductors. Colloids may also comprise polymeric materials, such as styrenes (e.g., polystyrene), acrylics and methacrylics (e.g., poly(methyl methacrylate), and fluorinated polymers (e.g., polytetrafluoroethylene). It will be appreciated that such examples are non-limiting and other additional materials, including other polymers, ceramics, coated colloids, and combinations of such materials are likewise contemplated in certain aspects. In certain embodiments, the plurality of colloidal particles may comprise a colloidal particle selected from the group consisting of: polystyrene, poly(methyl methacrylate), silica ($SiO_2$), and combinations thereof. In certain other embodiments, the colloid is selected from the group consisting of: poly(methyl methacrylate), polystyrene, and combinations thereof. In yet other embodiments, the colloid comprises silica ($SiO_2$).

The colloidal particles may be surface functionalized to enhance surface charge. For example, the colloids may be functionalized with the stabilizers, such as a polymeric moiety selected from the group consisting of: poly(12-hydroxy-stearic acid) (PHSA), polydimethylsiloxane (PDMS), diphenyldimethylsiloxane (DPDMS), and combinations thereof. Thus, in certain variations, a suitable colloidal particle comprises a poly(methyl methacrylate) having a functionalized surface comprising PHSA, PDMS and/or DPDMS. Further, in certain variations, the surfaces of the colloidal particles can also be surface functionalized with reactive groups, such as hydroxyl groups, carboxyl groups, amino groups, amido groups, and the like.

The colloids may be provided in a medium in the unassembled state (without light activation) at a concentration of greater than or equal to about 1% to less than or equal to about 20% by volume of the total volume of the medium and colloidal particles. In certain variations, the volume fraction ($\phi_0$) of colloidal particles in the total volume of medium (colloids and liquids) may range from greater than or equal to about 0.01 to less than or equal to about 0.3, optionally greater than or equal to about 0.01 to less than or equal to about 0.2, optionally greater than or equal to about 0.0125 to less than or equal to about 0.2.

Solvents useful for preparing medium to be mixed with colloids of the present invention include, but are not limited to, water, alcohols (such as ethanol and propanol), organic and polar, protic solvents. The medium may comprise impurities or may have additional components, such as salts or electrolytes added thereto. The medium is desirably electrically conductive and/or reactive with the electrically conductive material when exposed to light. Thus, in certain variations, the medium, including any additives, has a dielectric constant of less than about 80 (that of pure water), optionally greater than or equal to about 2 to less than or equal to about 50, and in certain variations, greater than or equal to about 5.1 to less than or equal to about 50. The medium may be provided at a concentration of greater than or equal to about 80% to less than or equal to about 99% by volume of the total volume of the medium and colloidal particles.

By way of non-limiting example, particularly suitable solvents for use as the medium may be selected from the group consisting of: cyclohexyl-bromide (CHB), decahydronaphthalene (decalin), dimethyl sulfoxide (DMSO), water, and combinations thereof. In certain variations, the medium comprises an organic solvent. Notably, in certain variations, if water is used in the medium, it may be further combined with another solvent or has salts or electrolytes added thereto to provide a reduced dielectric constant (e.g., a dielectric constant of less than 80). The solvents optionally may be nearly refractive index matched with the particles, although this is not necessary. In certain aspects, where the plurality of colloidal particles comprises poly(methyl methacrylate), the solvent comprises cyclohexyl-bromide (CHB), decahydronaphthalene (decalin), or combinations thereof. In other aspects, where the plurality of colloidal particles comprises polystyrene, the solvent comprises water, dimethyl sulfoxide (DMSO), or combinations thereof. Furthermore, various solvents are well known by those of skill in the art to be particularly suitable for conventional colloidal particles and thus, while not necessarily detailed here are likewise contemplated by the present disclosure. The medium may comprise impurities or diluents, as well as other common known additives used in colloidal systems, such as surface-active agents, surfactants, stabilizers, colorants, antioxidants, antifoaming agents, and the like.

In addition to one or more solvents, the medium optionally further comprises additives, such as electrolytes or salts. The presence of such electrolyte species may serve to enhance photoreactivity in the system, reducing the dielectric constant of the medium, and enable photocatalysis to generate an internal electric field in the medium and drive organization and assembly of the colloidal particles. In certain variations, a salt added to the medium is an organic salt. A suitable salt includes tetrabutylammonium bromide (TBAB), which serves as a disassociating species within the medium, as will be described in further detail below. In certain aspects, where the colloidal particle comprises poly (methyl methacrylate) the medium comprises tetrabutylammonium bromide (TBAB) and a solvent selected from the group consisting of: cyclohexyl-bromide (CHB), decahydronaphthalene (decalin), and combinations thereof. A suitable concentration of tetrabutylammonium bromide (TBAB) may vary from greater than 0 to less than or equal to about 1000 μM.

One of skill in the art will appreciate that other variables including pH, electrolyte and salt concentration, pressure, and ambient conditions can be varied within the medium for control of organization of arrays of colloidal crystals to have the desired characteristics.

The substrate may be formed of an inorganic material or a polymer. The substrate may be selected to be transmissive to a portion of the light generated by the light source, so that a suitable fraction of light generated by the light source is transmitted to the electrically conductive material. This is turn provides the necessary level of light energy on the electrically conductive material to provide photoreaction in the system. In certain aspects, the substrate may be glass (e.g., silica or borosilicate) or any other transparent material.

The electrically conductive material may be formed of a conductive material or a semiconductor material (such as a doped semiconductor material). In certain aspects, the electrically conductive material comprises a material selected from the group consisting of: indium-tin-oxide (ITO), gold (Au), silver (Ag), platinum (Pt), iridium (Ir), palladium (Pd), tungsten (W), stainless steel (SS), zinc (Zn), titanium (Ti), aluminum (Al), their alloys and oxides and combinations thereof.

As discussed above, the light source generates light or electromagnetic radiation, which is directed from outside the device, to the electrically conductive material, thus facilitating photoreaction of the medium in contact therewith. Particularly suitable light falls within either the visible light spectrum or the ultraviolet electromagnetic radiation spectrum. In certain variations, the light has a wavelength ranging from greater than or equal to about 380 nm to less than or equal to about 561 nm in the visible range. In other variations, the light may be ultraviolet radiation (UV) (including ultraviolet A, ultraviolet B, ultraviolet C, near ultraviolet, middle ultraviolet, far ultraviolet, extreme ultraviolet, and vacuum ultraviolet) having a wavelength of greater than or equal to about 10 nm to less than or equal to about 400 nm. In still other variations, the light may be ultraviolet radiation in a range of greater than or equal to about 100 nm to less than or equal to about 400 nm (including ultraviolet A, ultraviolet B, ultraviolet C). Notably, the light may filtered light, focused light, polarized light, or may be extra-spectral or a mixture of different wavelengths. Suitable light sources include lasers, microscope optics, UV lamps, visible light, halogen lamps, light emitting diodes (LED), and the like, by way of non-limiting example. For example, suitable light sources are a 488 nm laser or an ultraviolet (UV) lamp (e.g., a mercury metal halide lamp). In certain aspects, the light may be directed in a controlled manner so as to define a pattern, by optics or masking for example, onto the electrically conductive material and thus assembling the colloidal particles in the design of the pattern.

The principles of the present disclosure thus enable assembly and organization of colloidal particles in a medium by use of light alone. In this regard, the device is passive, receiving light from the light source, but does not require any external electric fields, current, impedance, or templating to drive assembly of colloids, as has been required in conventional systems. Thus, the devices according to various aspects of the present disclosure eliminate the need to use electrodes, an external power supply, magnets, complex circuitry, wires or leads for external connection or coupling with a power source, for example. Accordingly, the devices prepared in accordance with certain aspects of the present disclosure provide a device with minimal power consumption and a simplified, compact design.

In other aspects, the present disclosure contemplates methods for assembling colloidal particles, for example, crystallizing colloidal particles. In certain preferred aspects, the assembly methods are reversible. Colloidal crystallization can be induced in spatially selective regions by using light to generate a local electric field. In certain variations, the present disclosure provides a method for controlling assembly of colloidal particles. The method comprises directing light at an electrically conductive material in direct, physical contact with a medium comprising a plurality of colloidal particles. The light may be generated via a light source associated with the system. The presence of light directed to the electrically conductive material reversibly drives the plurality of colloidal particles from a first non-assembled state to a second assembled state. The localized internal electric field generated by directing light at the electrically conductive material directs colloidal particle motion by coupling to charge on the particle (e.g., surface charge), thereby inducing electrophoresis that leads to colloidal assembly. As noted above, the colloidal particles have surface charge that facilitates the reversible transition from an unassembled state to an assembled state and then back to an unassembled state when the light is removed/deactivated once again and therefore absent. Further, the plurality of colloidal particles is reversibly driven in the absence of any external electric fields or external magnetic fields. Any of the colloid system device embodiments discussed previously above are contemplated for use with the present methods, by way of non-limiting example.

The transition from the unassembled state to the assembled state may occur on the order of seconds after the initial introduction of light to the electrically conductive substrate. For example, the transition from the unassembled state to the assembled state of colloidal particles may occur with a time of less than or equal to about 90 seconds, optionally less than or equal to about 80 seconds, optionally less than or equal to about 70 seconds, optionally less than or equal to about 60 seconds, optionally less than or equal to about 50 seconds, optionally less than or equal to about 40 seconds, and in certain variations, optionally less than or equal to about 30 seconds. As discussed above, the spatial resolution between the depleted regions of medium and the concentrated regions of medium is excellent providing high-resolution delineation of crystallized or assembled regions.

The light directed at the electrically conductive material may be visible light or ultraviolet (UV) light. In certain aspects, the light has a wavelength of greater than or equal to about 10 nm to less or equal to about 561 nm. The light may be UV light and have a wavelength of greater than or equal to about 10 nm to less or equal to about 400 nm. In other aspects, the light may be select wavelengths within the visible light spectrum, for example, wavelengths of greater than or equal to about 400 nm to less or equal to about 561 nm. The boundary region between a first region and a second region is optionally less than or equal to about 100 nm and may be any of the values previously listed above, for example.

As discussed above, in certain variations, the electrically conductive material comprises $In_2O_3$ and $SnO_2$ (indium tin-oxide (ITO)). The indium tin-oxide (ITO) may be a coating on a substrate, such as glass. For example, an indium tin-oxide (ITO) coated glass substrate at the base of a colloidal suspension is illuminated with an external source of light, such as a 488 nm laser or an ultraviolet (UV) source. In this manner, a local electric field is believed to be generated within the medium. Localized illumination of the electrically conductive material (e.g., ITO coating) results in motion of the colloidal particles either toward or away from the illuminated region. As discussed further below, the assembly kinetics and structures are characterized in situ by direct visualization with a confocal laser scanning microscope. Such a process is fully reversible and the colloidal particles are fully reconfigurable. The process is non-invasive, operates at low power, and generates structures of complex shape with sharp high-resolution features.

In certain aspects, certain colloidal particles, such as PMMA particles, in a medium comprising CHB and decalin, accumulate towards the light and generate an assembly if the colloidal particles have a surface with a zeta (ζ) potential of less than 0 mV. These zeta potentials are obtained by adding electrolytes, such as TBAB, to the medium. Assemblies are thus observed with an addition of TBAB at concentrations greater than or equal to about 8.75 μM. In other aspects, colloidal particles are driven away from the light and create a void at the lighted region if the particles have a surface with a zeta (ζ) potential of greater than 0 mV. These zeta (ζ) potentials are obtained at TBAB concentrations less than or equal to about 7 μM.

In other aspects, the present disclosure contemplates methods of making a device for controlled assembly of colloidal particles. In certain aspects, this may include disposing a medium comprising a plurality of colloidal particles having a charged surface in contact with an electrically conductive material to create the device. The medium is selected to have a dielectric constant of less than about 80. The charged surface of the colloidal particle has a ζ-potential of greater than or equal to about −100 mV to less than or equal to about 100 mV, and optionally of greater than or equal to about −20 mV to less than or equal to about 20 mV. The disposing may include pouring or applying the medium and colloidal particles into a receptacle (e.g., substrate) or other containment area (for retaining the medium in a liquid form) having the electrically conductive material applied to one or more select regions. The method may alternatively further comprise applying the electrically conductive material as a coating to the receptacle or containment area. Metal or conductive material deposition techniques include by physical vapor deposition (PVD), chemical vapor deposition (CVD), atomic layer deposition (ALD), chemical vapor infiltration, wet chemistry, and other known conventional processes to apply such coatings to solid materials. In certain aspects, the medium and colloidal particles can be admixed together before disposing them on the electrically conductive substrate. The medium may comprise any of the solvents and colloidal particles discussed previously, but in certain variations, the medium comprises a solvent selected from the group consisting of: cyclohexylbromide (CHB), decahydronaphthalene (decalin), dimethyl sulfoxide (DMSO), water, and combinations thereof, while the plurality of colloidal particles comprises a colloidal particle selected from the group consisting of: polystyrene, poly(methyl methacrylate), silica ($SiO_2$), and combinations thereof.

The device thus formed is configured to receive light from an external light source, so that in the absence of the light, the plurality of colloidal particles are in a first non-assembled state and in the presence of the light, the plurality of colloidal particles are reversibly driven into a second assembled state, where the device has no external electric fields or external magnetic fields. In certain aspects, the methods of making the device includes placement of one or more light sources with respect to the electrically conductive material (along a side opposite to the side contacting the medium).

Thus, the present disclosure provides a simple, directed assembly methods and devices that yield 3D colloidal crystals that are simultaneously reconfigurable in space and time. Moreover, the methods and devices of the present disclosure have fast assembly kinetics, for example, observed crystals are produced on time scales of less than or equal to about 60 seconds, for example, and in spatially selective regions (scales as small as about 10 nm), thus having high resolution. The inventive technology thus provides use of light as a non-invasive method of prompting localized self-assembly of colloids. Thus, template-free photolithography of 3D colloidal crystals is contemplated, which allows the functional properties of colloidal crystal assemblies to be reconfigured rapidly in both space and time.

Such colloidal assemblies are produced on fast time scales (time of less than or equal to about 60 seconds) and in spatially selective regions (scales as small as approximately 10 nm).

The present teachings contemplate directed, reversible and localized assembly of colloidal particles in response to light coupled to an electrically conductive material to produce a three-dimensional (3D) crystalline assembly. The assembly process may be reversed by presence or absence of light, as well as by varying the electrolyte concentration. Regions can be selected to be concentrated with accumulated colloidal particles or crystals or to be devoid of colloidal particles or crystals due to electrophoresis of colloids generated by photochemistry on an electrically conductive (e.g., $InSiO_2$) coated substrate. The created regions can be reconfigured and manipulated using optics.

In accordance with various aspects of the present disclosure, the simultaneous spatial and temporal control of colloidal crystallization is new, and opens the possibility of a variety of applications including adaptive colloidal crystal optics and reconfigurable circuit elements. The present technology is compatible for use with commonly available, sterically stabilized, charged latex colloids dispersed in low dielectric constant solvents, providing high levels of control over assembly.

Colloidal molecules interact with a range of electromagnetic waves and can exhibit plasmonic and photonic properties in arrays. These properties make them appealing for use in metamaterials and photonic crystals, as well as in applications like sensing, communication, circuit elements and reconfigurable circuits, and photoresponsive materials. Ordered particle arrays are likewise suitable for use in optical filters, switches, photonic crystals, photoresponsive materials and electronic ink displays.

In certain variations, the reconfigurable photoresponsive colloidal systems are electronic inks (e-inks) used in screens for popular electronic reading devices and tablets. E-inks are used in a variety of electronic visual displays, including digital signage, billboards, touch screens, mobile device screens, such as phones or tablets, and electronic readers. Thus, the devices of the present disclosure may be incorporated into displays for such devices.

Likewise, reconfigurable circuit elements are useful in a number of computing and other scientific applications. Such self-reconfiguring circuits can be used in self-healing applications or reconfigurations may change the functionality of the circuit. Self-healing circuits may be used in applications where damaged circuits may not be easily replaced or where circuit faults are to be expected to occur often. In other variations, methods of detecting analytes in a sample may use such controllable colloidal arrays.

Various embodiments of the inventive technology can be further understood by the specific examples contained herein. Specific examples are provided for illustrative purposes of how to make and use the compositions, devices, and methods according to the present teachings and, unless explicitly stated otherwise, are not intended to be a representation that given embodiments of this invention have, or have not, been made or tested.

EXAMPLE 1

In this example, colloidal systems are prepared for showing photoinduced assembly. The colloids prepared in this example are poly(12-hydroxy-stearic acid) (PHSA) stabilized poly(methyl methacrylate) (PMMA) (average particle size diameter (D)=1.40 μm, 5.6% polydispersity). Particles are dispersed in a refractive index and density matched solvent mixture of 66 vol. % cyclohexyl-bromide (CHB) and 34 vol. % decahydronaphthalene (decalin). Experiments are carried out in suspensions of initial volume fraction, $\phi_0$, varying from 0.0125 to 0.20 and tetrabutylammonium bromide (TBAB) is added at a concentration varying from 0 to 1000 µM.

ITO coated microscope cover slips (d of approximately 0.170 mm) are used as a bottom surface of a vial, with the ITO coating facing inward. The ITO coating is about 65 nm thick with approximately 500 Ω/square sheet resistance (available from ZC & R Coatings, Inc.).

In other experiments, a glass vial having a cylindrical geometry (D=10 mm, H=1.25 mm) is used, where an interior of the bottom of the vial had been coated with a 65 nm thick layer of indium tin oxide (ITO).

In another set of experiments, a gold coating is used instead of the ITO coating. The gold coating has a 15 nm thick with an approximate 7.5 nm chrome layer, sold by Denton Vacuum).

EXAMPLE 2

This example explores photoinduced colloidal assembly. The system studied is a common one for colloidal self-assembly having 1.4 µm colloidal poly(methyl methacrylate) (PMMA) stabilized with poly(12-hydroxy-stearic acid) (PHSA) and dispersed in a refractive index and density matched solvent of cyclohexyl-bromide (CHB) and decahydronaphthalene (decalin) as described above in Example 1.

A 200 µl solution of these colloidal particles, with 50 µM of the disassociating species tetrabutylammonium bromide (TBAB) added, is pipetted into a cylindrical glass vial, as described above, where the interior of the bottom of the vial has been coated with a 65 nm thick layer of indium tin oxide (ITO).

Two different light sources are used for exploring the photoinduced assembly in this and the following examples. First, a 488 nm laser light is focused at the ITO coated cover slip using a 100× oil immersion objective lens (NA=1.40). The laser power is delivered by a confocal laser scanning microscope (CLSM, Leica TCS SP2 or Nikon A1R), in which a pointwise scan of the region (25×25 µm$^2$) is performed with a duty cycle of 66%. The laser power density varied from 2.7 to 12 W cm$^{-2}$ (Optical power meter 1916-C, detector 818-ST, Newport).

Second, in other experiments, a UV light source (Leica EL6000, Mercury metal halide bulb, 360 nm) is used for illumination in some cases. This radiation is projected onto a circular region (D=150 µm) with a mean flux of 0.62 W cm$^{-2}$ (UV meter 306, OAI). Another UV light source (Nikon A1R stimulation scan, 405 nm) is used to scan a region-of-interest of a complex shape.

Figures 3A, 3B, 3C, 3D, 3E, 3F, 3G, 3H, 3I, 3J, 3K, 3L, 3M:
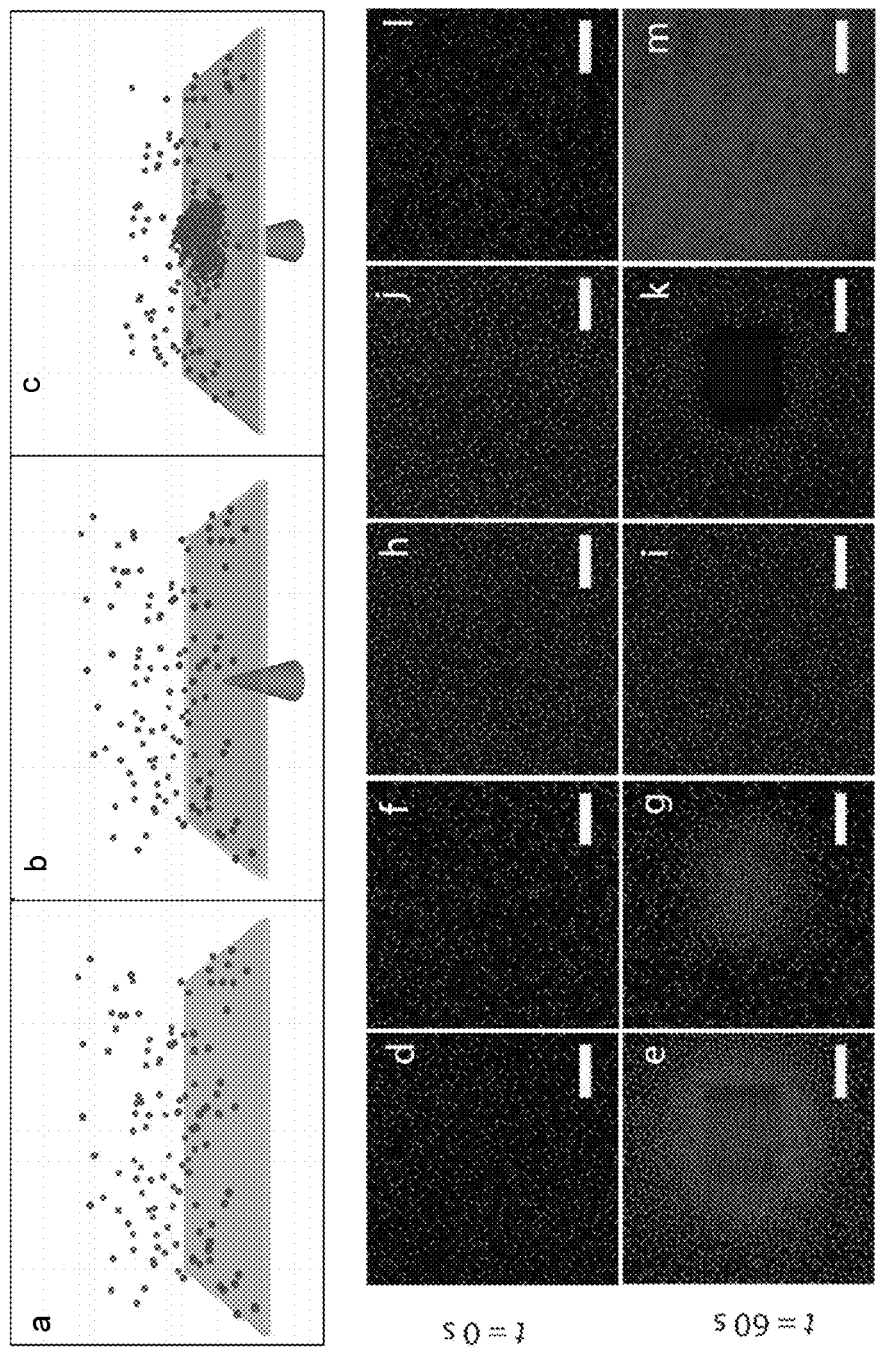

In this experiment, when a 25×25 µm$^2$ region of the surface is illuminated with a 488 nm laser (12 W cm$^{-2}$), accumulation of particles is observed in the vicinity of the illuminated region in about 60 seconds (FIGS. 3A-3C).

At this condition, as in many others, the accumulation of particles is sufficient for colloidal crystal ordering (shown in FIG. 3E). The greatest concentration of particles is found within the illuminated region, with modest photo bleaching (FIG. 3E). FIGS. 3D-3E show the ITO-coated substrate at 0 seconds and 60 seconds after light is directed towards the substrate, where the light is 488 nm. FIGS. 3F-3G show the gold-coated substrate at 0 seconds and 60 seconds after light is directed towards the substrate, otherwise having the same conditions as in FIGS. 3D-3E. FIGS. 3H-3I are a control, where the vial has no electrically conductive material (uncoated silica glass) at 0 seconds and 60 seconds after light is directed towards the glass. FIGS. 3J-3K include the ITO-coated substrate and the medium has no tetrabutylammonium boride (TBAB) shown at 0 seconds and 60 seconds after light is directed towards the substrate. FIGS. 3L-3M show a vial like in FIGS. 3D-3E, but using a different wavelength of light at 360 nm (UV light generated by a mercury metal halide lamp), the ITO-coated substrate at 0 seconds and 60 seconds after the light is directed towards the substrate.

The effect of the light on the self-assembly reported in FIGS. 3A-3G and 3J-3M is not due to optical trapping and radiation pressure, because the particles are nearly refractive index matched with the solvent ($\Delta n/n$=0.002). The observed colloidal velocity is three orders of magnitude greater than what would be expected due to optical trapping and radiation pressure, as per a calculation using Mie scattering theory.

The particle accumulation effect only occurs for the case of conductive or semi-conductive substrates. For example, replacing the ITO coating with gold still yields particle accumulation (as shown in FIGS. 3F-3G).

The corresponding control experiment, with illumination of an (uncoated) silica cover slip, yields no particle accumulation (FIGS. 3H-3I). The effect appears to require direct contact of the ITO substrate with the colloidal solution. Specifically, when the ITO coated substrate is flipped so the silica-side is in contact with the solution, or when the ITO layer is covered with a thin layer of deposited silica, the photoinduced motion is no longer observed. These observations, along with finite difference simulation, indicate that the system has very low temperature gradients, ruling out electrothermal and thermophoretic explanations of the photoinduced motion.

The assembly is also a sensitive function of TBAB concentration. FIGS. 3J-3K show that colloids are expelled from the illumination region, instead of collected, when the 50 µM of TBAB is not added to the CHB/decalin solvent mixture.

Particle accumulation is also observed at other illumination wavelengths. Illumination with a mercury metal halide lamp (360 nm) yields accumulation of particles as indicated by FIGS. 3L-3M. Thus, the directed assembly phenomenon is common to these conditions, and appears to be predicated on the coupling of electromagnetic illumination to an absorptive, conductive substrate such as ITO. Additional features of the effect, such as the solvent conditions, the particle types, and the illumination wavelengths in which assembly or depletion is observed, are discussed herein.

First, there appears to be a strong effect of solvent conditions on whether or not the photoinduced effect is observed. While organic, low dielectric constants systems, such as CHB and decalin, demonstrate significant photoinduced assembly response to electromagnetic illumination, systems of higher dielectric constants, such as dimethyl sulfoxide (DMSO) and water, show little to no photoinduced effect in certain systems (in other words, for certain wavelengths of light in the UV range, there are photoinduced reactions and assembly, but certain other wavelengths in the visible light range did not exhibit effective photoinduced reactions). It appears that dielectric constant of the solvent is a parameter important for the assembly of colloids studied here.

Second, in solvents in which colloid particles display the photoinduced effect, whether or not assembly or depletion is observed is a strong function of the kind of colloids used. The photoinduced effect is studied for PMMA colloids with various surface stabilizers and polystyrene (PS) colloids. Assembly is observed under a variety of conditions for PMMA colloids.

For example, assembly occurs for different substrates illuminated (having electrically conductive gold or ITO coatings), varying wavelengths of the laser (458 nm, 476 nm, and 488 nm), laser powers ranging from 2.7 to 12 W cm$^{-2}$, initial volume fractions of particles varying from 0.0125 to 0.20, and particle sizes from 0.6 to 1.4 μm.

All of these experiments are carried out with PHSA stabilized PMMA colloids in CHB/decalin with 1 mM TBAB electrolyte. Other surface functionalized PMMA particles, such as those synthesized with the stabilizers polydimethylsiloxane (PDMS), diphenyldimethylsiloxane (DPDMS), likewise show depletion at the illuminated region, similar to that observed for PHSA stabilized PMMA colloids with no TBAB.

PS particles demonstrate no signs of assembly in both water and DMSO solvents of 0.1 mM TBAB under visible light excitation, whereas, under UV illumination (e.g., different wavelengths of light), with the same solvents, PS particles are found to accumulate in DMSO.

Third, for colloid particles and solvents that exhibit the photoinduced effect, the magnitude of the effect, as indicated by the speed of the assembly and the extent and quality of the ordered structures formed, is a function of whether visible or UV light is used. With the UV illumination (e.g., 360 nm), faster accumulation is observed relative to the case of visible light. Faster accumulations with UV illumination are observed for both PHSA stabilized PMMA colloids and for PS particle suspensions. For these cases, PMMA particle suspensions are prepared in 1 mM TBAB solution of CHB/decalin.

EXAMPLE 3

Figures 4A, 4B, 4C, 4D, 4E:
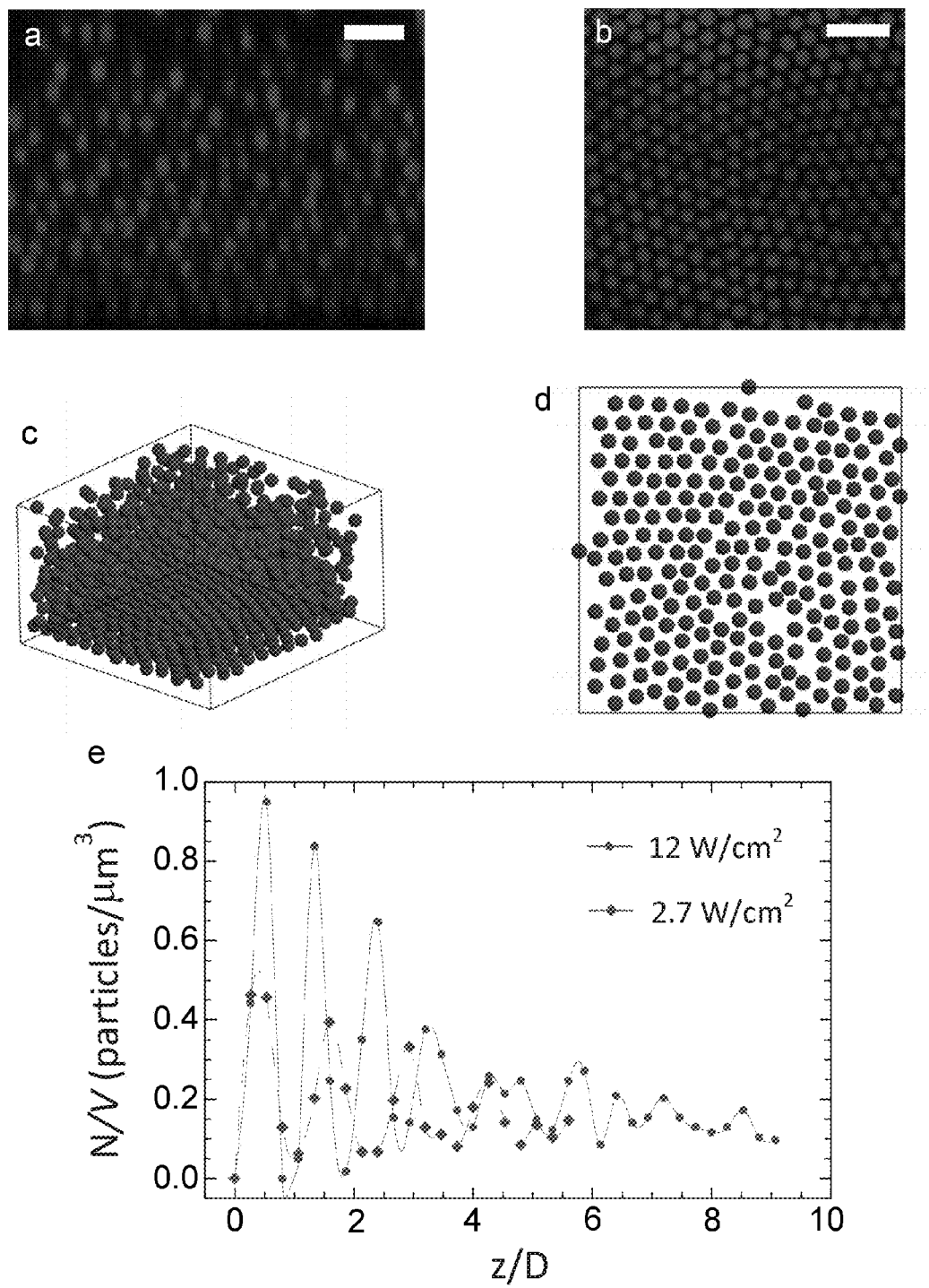

Three-dimensional structures of the assembled crystals are explored in these experiments for the colloid systems like in Examples 1 and 2 (where PHSA stabilized PMMA colloids are in CHB/decalin medium with TBAB present). The photoinduced effect yields finite-thickness quasi-2D colloidal crystals. At steady-state, and at the laser power densities studied, the penetration depth of the accumulation is about 10 μm, resulting in a stacking of about 5 crystalline layers (FIGS. 4A-4B). The 3D structure of the crystal, as rendered by image analysis of confocal laser scanning microscope (CLSM) volumes, shows close-packed ordering with some defect structure (FIGS. 4C-4D).

CLSM is used to characterize the kinetics and structure of the photoinduced assembly (100× objective, NA=1.40). For the assembly kinetics, time series of 100-150 frames (512× 512 pixels) with spatial resolution of 49 nm pixel$^{-1}$ are collected at a frame rate of 1.6 s. For the assembly structure, 3D image volumes of 25×25×10 μm$^3$ are acquired at the voxel size of 49×49×46 nm$^3$. Centroidal coordinates of all particles are determined by methods discussed in Crocker et al., "Methods of digital video microscopy for colloidal studies," *J. of Colloid and Interface Science* 179, pp. 298-310 (1996) and characterized in Dibble et al., "Structure and dynamics of colloidal depletion gels: Coincidence of transitions and heterogeneity," Physical Review E, 74 (1), p. 041403 (2006), each of which are incorporated herein by reference in their entireties. The image analysis yield centroidal coordinates resolved at the scale of ±35 nm in the object plane and ±45 nm in the axial direction.

From these centroidal coordinates, the crystallization kinetics are characterized by determining the number of particles identified at each time frame. The structure of the ordered array is visualized by rendering the centroidal coordinates. The particle number density as a function of height above the ITO coated substrate is determined by evaluating the number of particles in slices of size 21×21× 0.4 μm$^3$. The particle volume fractions of the crystals are calculated from the three layers closest to the coverslip. For the analysis of FIGS. 5A-5F and 6A-6F, the near-wall volume fraction is that of the close-packed layer at the cover slip.

The local number density (N/V) of colloids is as large as 0.95 particles μm$^{-3}$ at the ITO substrate at the largest power density studied (12 W cm$^{-2}$). The periodic variation in particle density apparent in FIG. 4E is further evidence of the layered structure, consistent with a colloidal crystal. The effect of the light on the self-assembly is significant: as the power is changed from 12 W cm$^{-2}$ to 2.7 W cm$^{-2}$, the near-wall particle number density of the sample decreases from 0.95 to 0.46 particles μm$^{-3}$. Both self-assemblies, however, have crystalline structure. Under these conditions, the near-wall crystalline volume fractions (within the first three layers) are 47% and 34%, respectively. These values are consistent with that of the disorder to order transition boundary expected for the system of charged PHSA stabilized PMMA colloids. The theoretical phase transition boundary is determined to be φ=0.36, given the measured Debye screening length (95 nm) and the colloid zeta potential (−9 mV).

Figures 5A, 5B, 5C, 5D, 5E, 5F, 5G, 5H:
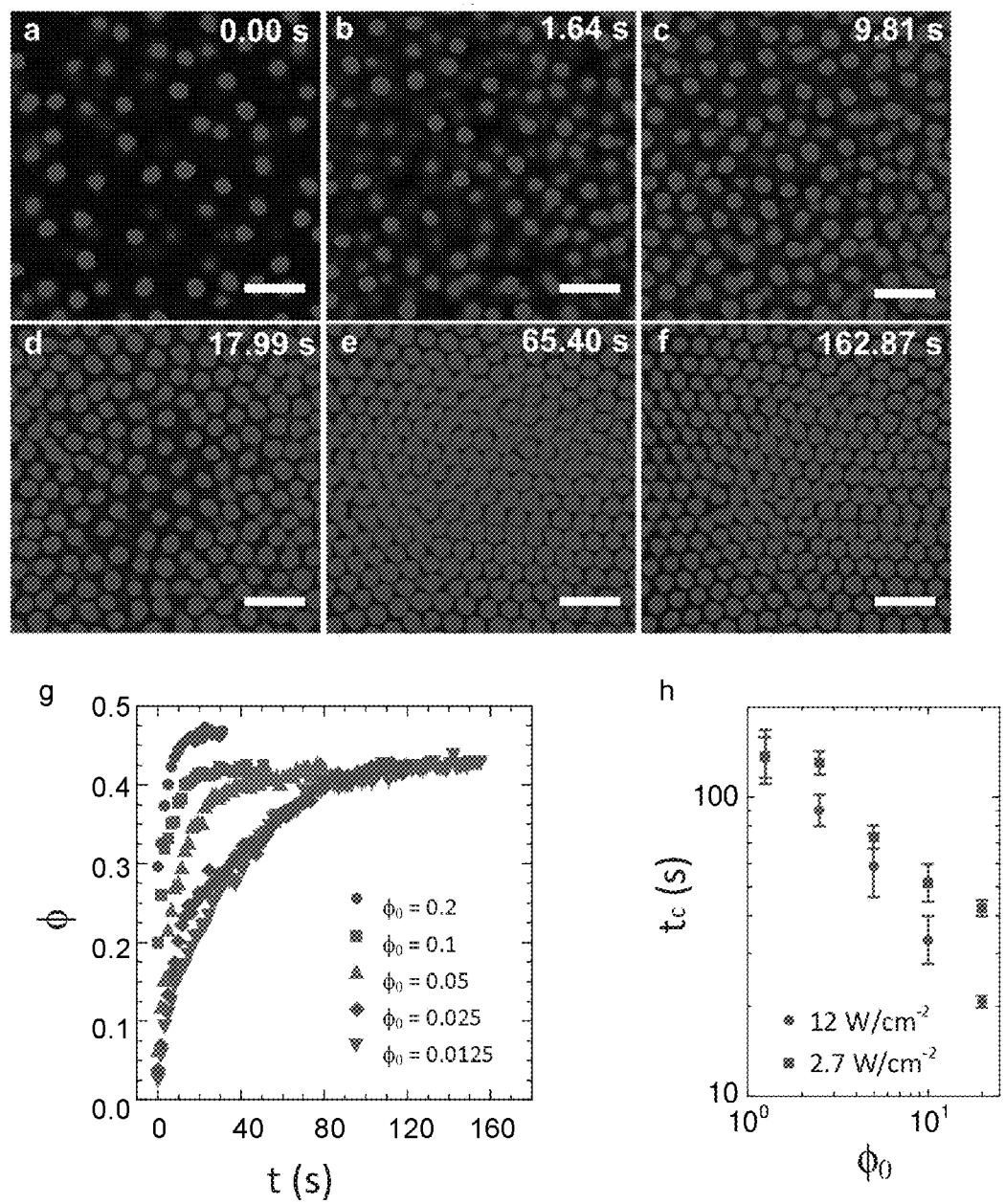

Kinetics of the photoinduced assembly is further explored here. The photoinduced assembly process occurs rapidly. The characteristic time for assembly is about 60 seconds (FIGS. 5A-5F). Upon laser exposure, particles are displaced from the suspension into the illuminated region. Particles begin to concentrate a few seconds after the ITO coated surface is exposed to the laser (FIG. 5B), until a crystalline structure is formed. Accumulated particles display a close-packed crystal ordering (FIG. 5E). For initial volume fractions studied ($\phi_0$=0.0125-0.20), the photoinduced volume fraction monotonically increases with time and reaches a steady-state (FIG. 5G). From FIG. 5G, a characteristic time for crystallization, $t_c$, is defined as the time for the assembly to reach 99% of its steady-state volume fraction. FIG. 5H shows that $t_c$ decreases with increasing $\phi_0$ and laser power.

The laser induced colloidal velocity is calculated by adapting an analysis available for sedimentation kinetics. The light illumination (e.g., UV) induced colloidal velocity is measured from tracking the colloidal motion. The theory of colloidal sedimentation, as discussed for example in Russel et al., W. R. Chapter 12 in *Colloidal dispersions*, pp. 414-417 (1989), the relevant portions of which are incorporated herein by reference, is adapted to infer the velocity of colloids undergoing photoinduced assembly. Here, only the particle velocity in the z-direction is considered because photoinduced motion is predominantly observed along the axis normal to the ITO coated surface. The analysis is based on the fact that, given mass conservation, the time rate of change of volume fraction requires a flux in particle density that is consistent with a particular value of the colloidal velocity.

In the present case, the driving force for colloidal motion is attributed to the force on the colloid due to the photoinduced effect, rather than the force of gravity. This theory is one dimensional, assumes a uniform driving force, and accounts for the retardation of colloidal mobility as volume fraction increases, as per:

$$\frac{h_a}{t_c} = U_0 \frac{\phi_0 K(\phi_0)}{\phi_a - \phi_0} \quad (1)$$

Here, $h_a$ is the height of the first crystalline assembly layer ($h_a$=1.4 μm), $t_c$ is the time to achieve a crystal of that height, $\phi_0$ is the initial volume fraction of colloids, $\phi_a$ is the volume fraction of the crystalline assembly, $K(\phi)=(1-\phi)^{6.55}$ is the sedimentation coefficient and $U_0$ is the particle velocity in the z-direction.

Equation 1 indicates that a plot of $t_c$ versus $$\frac{h_a}{U_0 K(\phi_0)} \left( \frac{\phi_a}{\phi_0} - 1 \right)$$

yields the inverse of the photoinduced velocity ($U_0$). FIG. 8 shows a plot per Equation 1 with data of FIGS. 5A-5H used to infer the velocity of colloids induced by the illumination with visible light. This characterization is carried out for experiments of photoinduced colloidal motion in a solvent with 1000 μM TBAB added and at a laser power density (at 488 nm) of 12 W cm$^{-2}$. Initial volume fractions are varied from 0.0125 to 0.20. As shown by FIG. 8, the data follow a linear trend with a slope of 3.53±0.29. The accumulation times of experiments prepared at five different initial volume fractions (0.0125, 0.025, 0.05, 0.10, 0.20) are plotted against parameters given. Solutions are prepared at 1000 μM TBAB concentration.

Here, the distance that the particle traveled within two consecutive images is measured and divided by the frame rate (0.815 s) to calculate the particle velocity. From a series of approximately 200 images, sequential images are extracted and analyzed to determine the average velocity.

The sedimentation dynamics is used to infer a particle velocity from measurements of $t_c$, as shown in FIG. 8. The slope of 3.51±0.29 is inversely related to the colloidal velocity. The photoinduced particle velocity (1000 μM TBAB, and 12 W cm$^{-2}$) is found to be 0.28±0.02 μm s$^{-1}$, independent of the initial volume fraction. Thus, the photoinduced particle velocity in the z-direction is therefore described by a uniform velocity $U_0$=0.28±0.02 μm s$^{-1}$. The decrease in $t_c$ with $\phi_0$ is a consequence of the faster filling of the assembly region due to the greater local availability of colloids at higher $\phi_0$. That is, at low $\phi_0$, it takes longer to crystallize the near-wall layer because the accumulating colloids must be drawn from a larger reservoir.

Figures 6A, 6B, 6C, 6D, 6E, 6F:
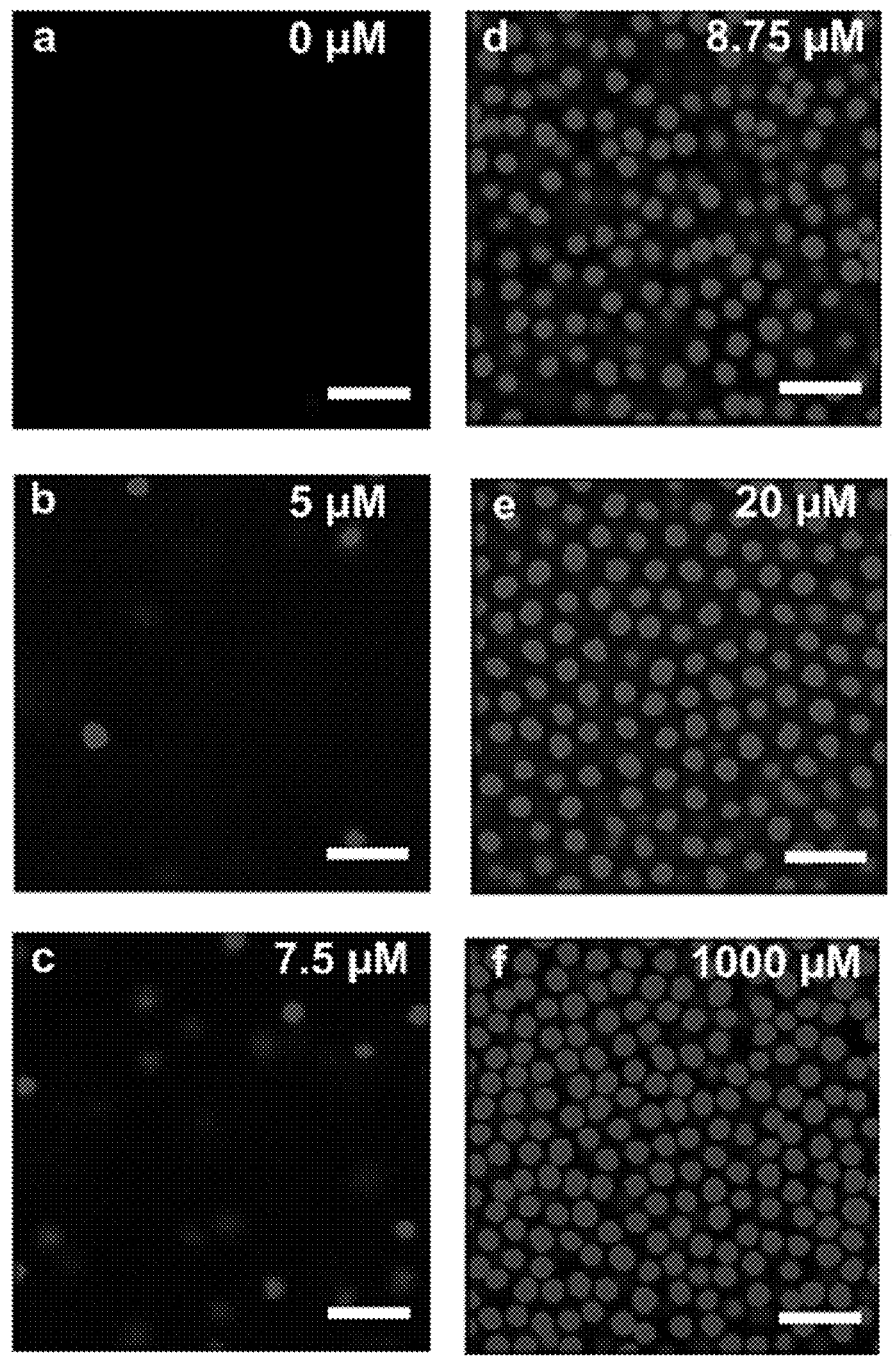

The effect of TBAB concentration on the photoinduced assembly is further explored here. The effect of light on assembly appears to be a strong function of TBAB concentration. FIGS. 6A-6H show a transition from depletion to assembly with varying [TBAB]. As TBAB concentration is varied from 0 to 1000 μM, reversal of the photoinduced effect occurs abruptly between TBAB concentrations of 7.5 μM and 8.75 M. Below the threshold condition of 7.5 μM, depletion of particles from the illuminated region is observed (FIGS. 6A-6C). Between salt conditions of 8.75-10 μM, the system demonstrates a weak driving force for assembly, as evidenced by the observation that the accumulation effect is not strong enough to generate a colloidal crystal. A disordered, liquid structure is instead observed (FIG. 6D). For TBAB concentrations greater than 20 μM, the steady-state assemblies generated are crystalline. Increase in salt concentrations led to a small increase in assembly volume fraction in this range of TBAB concentration. This small change is due to the crystalline structure having smaller particle separations at higher salt concentrations, due to the changing Debye length.

Figure 6G:
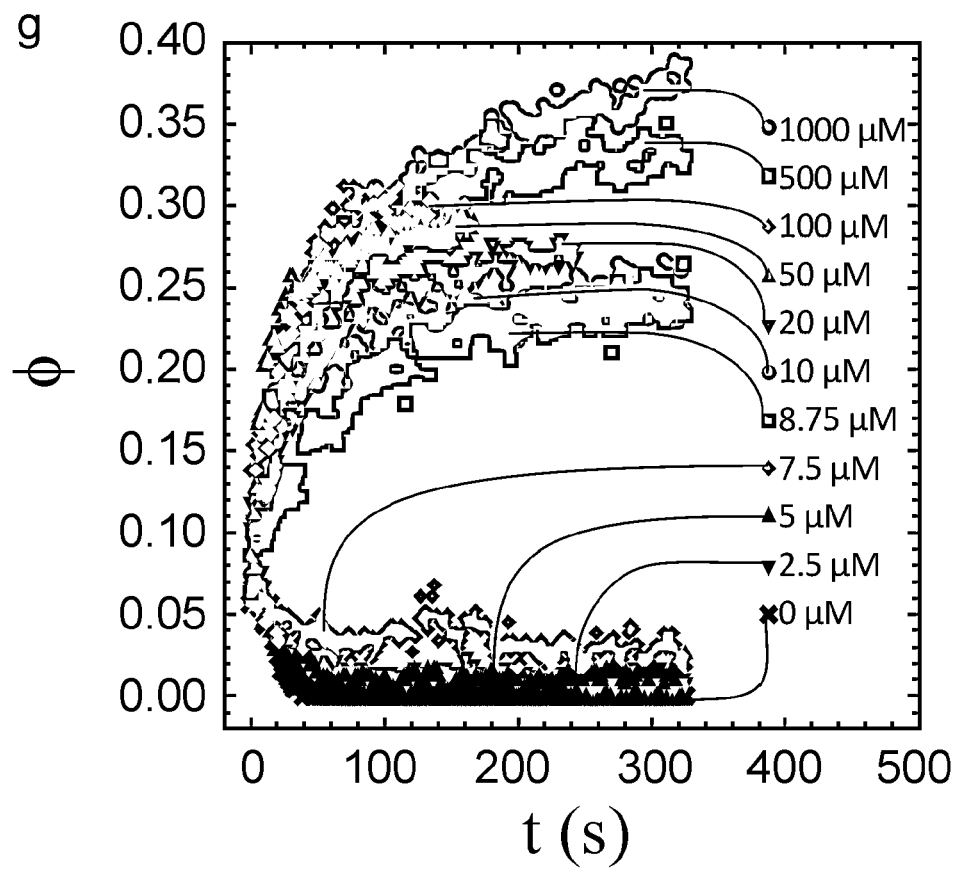
Figure 6H:
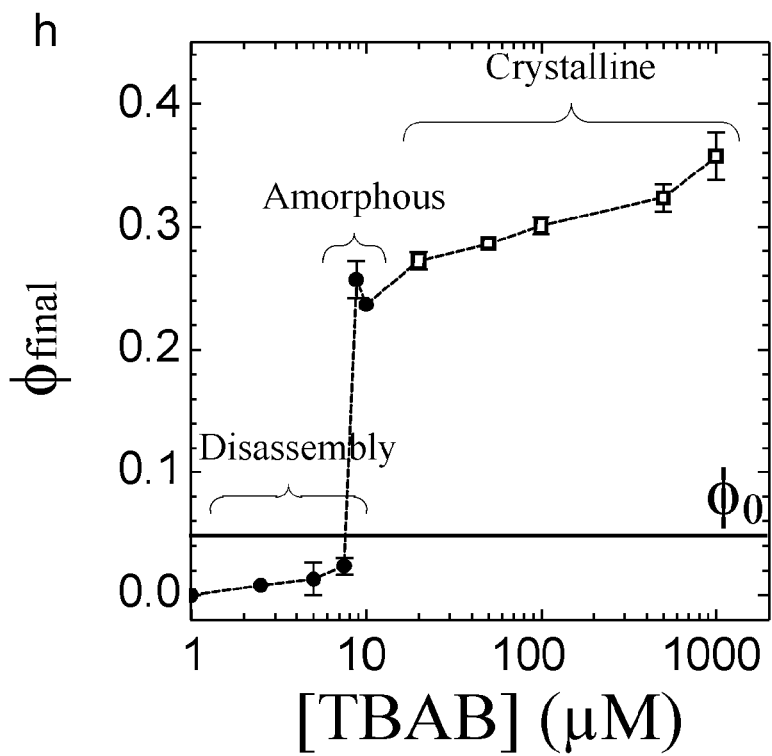

The effect of TBAB on the photoinduced assembly is quantified by measuring the local, near-wall colloid volume fraction as a function of time. Consistent with qualitative observations, φ decreases relative to the initial volume fraction for [TBAB]<7.5 μM and increases for [TBAB] >8.75 μM (FIG. 6G). Near steady-state volume fractions are reached for all conditions. By plotting the final volume fraction measured at each TBAB condition, the abrupt transition from colloidal depletion (at low TBAB concentration) to assembly (at high TBAB concentration) is apparent (FIG. 6H). The abruptness of the change, and the fact that it occurs at a finite TBAB concentration, discounts the role of the changing Debye length in this transition. Rather, as described further below, the abrupt change at approximately 8 μM TBAB is more likely due to the effect of [TBAB] on the colloid zeta potential.

The mechanism of the photoinduced colloidal crystallization is explored in FIGS. 7A-7I, which is consistent with these findings. Zeta potential and current measurements are made in the DC electric field device described by Shah et al., "Liquid Crystal Order in Colloidal Suspensions of Spheroidal Particles by Direct Current Electric Field Assembly," Small vol. 8, pp. 1551-1562 (2012), which is incorporated herein by reference in its entirety. Zeta-potential measurements are carried out in 1.25 vol. % particle suspensions with TBAB concentrations varying from 0 to 1000 μM. Particle mobility is tracked in planes perpendicular to the cover slip as a constant current is applied with the potentiostat (Autolab PGSTAT 128N) across the solution. Images are collected at 0.815 s per frame. Given the measured mobility, the electric field set up by the applied current, solvent properties (ε=5.962, μ=0.0025 Pa s) and the electrolyte properties ($\Lambda^0_{TBA+}$=6.5 cm$^2$ S mol$^{-1}$ and $\Lambda^0_{Br-}$=14.5 cm$^2$ S mol$^{-1}$), zeta-potentials are computed by the method of O'Brien, et al. "Electrophoretic mobility of a spherical colloidal particle," J. Chem. Soc. Faraday Trans. 2 vol. 74, pp. 1607-1626 (1978), which is incorporated herein by reference in its entirety. Similarly, the current density changes within the suspension are measured as light is turned on and off. UV illumination (360 nm peak wavelength) at 0.62 W cm$^{-2}$ is applied. The potentiostat is used to measure the current density variations under a constant zero potential (current detection range approximately 100 pA).

Independent measurements of the zeta potential of the PMMA colloids (FIG. 7A) show a remarkable coincidence between the sign of the measured colloid zeta potential (which reverses at approximately 20 μM TBAB) and the switch of the effect from depletion to assembly (which occurs at approximately 8 μM TBAB). Thus, this appears to be due to sensitivity of PMMA colloid zeta potential to TBAB concentration, including a change in the sign of the zeta potential. The coincidence of the assembly/depletion transition and the change in sign of the zeta-potential suggests that the photoinduced assembly effect is induced by light-induced electrophoresis of the colloids. This mechanism would imply the existence of an internal electric field generated within the system without use of electrode pairs or an external electric field, an external magnetic field, an external inductive field, and the like. While no electrode geometry has been fabricated into the system, the metallic surface of the electrically conductive material itself is potentially reactive.

If the surface of electrically conductive material is a substrate for chemical reactions, the resulting depletion in chemical species at the substrate would result in an ion flow normal to the illuminated region of the substrate. This ion flow will produce a current that yields an electric field of $$\text{magnitude} = \frac{j}{\lambda_0},$$

where j is the measured current density (per illuminated area) and $\lambda_0$ is the conductivity of the solution. Thus, if photoinduced electrophoresis is the mechanism for the observed directed assembly, then, a current ought to occur in the system when light illuminates the electrically conductive material (e.g., ITO substrate). The current itself is quite small, because of the small illumination area (approximately $1.8 \times 10^4$ $\mu m^2$ in most cases). The magnitude and direction of the current is generally consistent with the magnitude and sign of the colloid zeta-potential.

Taken together, these results limit the possible mechanisms of the photoinduced assembly. To summarize, the mechanism is generally consistent with: local colloid motion of approximately 0.3 $\mu m$ $s^{-1}$ induced when a metallic or semiconducting substrate is illuminated with a 488 nm visible light at a power of 12 W $cm^{-2}$ (for the UV case, the corresponding measured velocity is 1.8±0.3 $\mu m$ $s^{-1}$ at a power of 0.62 W $cm^{-2}$); near refractive index matching ($\Delta n/n=0.002$) of the colloids and solvent; that the semiconducting or metallic substrate is in direct physical contact with the colloidal solution; and a change from colloidal depletion to assembly in the region of illumination at approximately 8 $\mu M$ as TBAB concentration is varied between 0 and 1000 $\mu M$.

EXAMPLE 4

To further test the hypothesis regarding generation of an internal localized electric field via photoreaction, the following experiment is performed: For a solution of 5 vol. % particles in CHB/decalin with 1000 $\mu M$ TBAB, the current density, j, is measured as UV illumination (360 nm, 0.62 W $cm^{-2}$) is turned on and off (FIG. 7B). A significant change in the current density as the UV light is switched on and off is observed. Simultaneously, CLSM images are collected (FIGS. 7C-7E). The results show that the application of light coincides with both a change in the current density and the observation of assembly. Additional details are also consistent with the mechanism.

First, the negative zeta potential (at 1000 $\mu M$ TBAB) is in accord with the observation of colloidal motion towards the illuminated electrode at this condition. Specifically, particle motion in this direction indicates that the illuminated electrode is the anode, consistent with the negative sign of the measured cathodic current, as plotted in FIG. 7B. Second, the up and down motion of the microscope's optical scanner is observable in the current density (FIG. 7B), consistent with an effect of visible light on accumulation. Third, the magnitude of the colloidal velocity predicted from the electric field is consistent with direct measurements of UV induced velocities.

The following additional observations on the light-induced electrophoretic mechanism are provided. First, the direction of colloidal motion, the sign of the measured current, and the sign of the zeta potential, as reported in FIGS. 7A-7I, are all consistent with each other. Second, the up and down motion of the microscope's optical scanner is observable in the sinusoidal variation in the current density in FIG. 7B. The frequency of the variation coincides with the scanning frequency of the optical scanner used for the experiment (1.635 s). As the scanner propagates upwards from the coverslip to acquire the assembly images, the light-ITO interaction decreases, and the measured current shifts toward its "off" value. The fact that the laser scanning is observable in the current measurement, in addition to the large change in current induced by the UV light, suggests that the visible laser itself is able to induce change in the system as well, consistent with observations in earlier figures of photoinduced motion with the 488 nm laser. Third, the magnitude of the colloidal velocity predicted from the electric field generated by this experiment is consistent with the direct measurement of the UV induced colloidal velocity. Given the electric field ($1.5 \times 10^4$ V $m^{-1}$) set up by the photoinduced current density, the viscosity of the solvent (0.0025 Pa s), and the colloidal zeta potential at 1000 $\mu M$ TBAB (−9 mV), the electrophoretic colloid velocity is estimated to be approximately 4 $\mu m$ $s^{-1}$, roughly consistent with approximately 2 $\mu m$ $s^{-1}$ from direct measurements of colloid motion during the UV induced crystallization.

Thus, in summary, while not limiting the present teachings to any particular theory, it is believed that the photoinduced assembly occurs due to an internal electric field generated by a light-induced current without any electrode pairs of external electric fields. Such photoinduced current modulation has never been observed in the absence of an externally applied electric field and the absence of fixed electrodes. Here, instead, the electric field can be solely generated internally by application of light alone. It is this internally generated field, induced by light alone, that allows the simultaneous spatial and temporal control of the assembly without need for other hardware, such as templating or electrodes.

As noted above, the two potential origins of the light-induced chemistry are possible. The light could catalyze a reaction of dissolved species, such as residual water, oxygen, or surfactants such as TBAB at the ITO substrate; these redox reactions can drive a current that would induce an electric field. Alternatively, the light-induced ionization of dissolved species, such as TBAB, could create a concentration gradient within the solution, spontaneously setting up an electric field and thereby generating electrodiffusiophoresis. Both mechanisms are consistent with the observation that the photoinduced motion occurs after illumination of a semiconducting or metallic substrate material that is in direct contact with the colloidal solution.

The fact that the phenomenon requires a light/reactive substrate interaction means that the effect is extremely localized in space and time. FIGS. 7F-7I show applications of certain techniques according to the present disclosure that create complex shapes of colloids. A 405 nm laser is used to scan this intricate design, drawn as a region-of-interest by the microscope's optical scanner. The Region-of-Interest (ROI) stimulation method of CLSM (Nikon A1R, 100× oil objective, NA=1.49) is used to create assembly and depletion structures of complex shapes. Simultaneous imaging (561.6 nm) and scanning (405 nm) are done with a resonant scanner at a frame rate of 0.067 s. Stimulation area is defined by the ROI designed as a specific shape on the confocal software. Images (512×512 pixels) are collected at a spatial resolution of 0.249 $\mu m$ $pixel^{-1}$.

Images taken perpendicular to the cover slip having the electrically conductive material coating show that the effect of light on the particle assembly is temporally correlated with changes in current density due to the illumination. See FIGS. 7F-7I have scale bars of 15 µm. Because the current density is produced only in the illuminated region, the photo-induced assembly and depletion effects can be achieved when complex shapes are illuminated by the light, as is possible by, for example, using the optics of the scanning microscope. FIGS. 7F-7G show before and after images of colloidal assembly show accumulation of particles in the illuminated region of complex shape. The colloidal solution is prepared at 5% initial volume fraction with 1000 µM TBAB in CHB/decalin. FIGS. 7H-7I show before and after images of a colloidal assembly where depletion of colloidal particles occurs within the illuminated region of complex shape. The initial colloidal volume fraction is 10% and the solvent is pure CHB/decalin. The scale bars are 20 µm.

Therefore, in accordance with various aspects of the present disclosure, colloidal assemblies are provided that are entirely reconfigurable and reversible. Colloids rapidly assemble and deplete within a few seconds of illumination to form structures with sharp features and well-defined boundaries. The definition of these features and boundaries is as good for the case of accumulation-type assembly as it is for depletion-type assembly. Both kinds of structures created are fully reversible. The results indicate the rapidity, reversibility, and spatial specificity for producing 3D regions of colloidal ordering and depletion in accordance with the inventive technology. With these characteristics, the photoinduced electrophoretic methods of the present disclosure have broad applications for new materials comprised of reconfigurable assemblies, especially for the template free, electrode free, spatially selective assembly of 3D colloidal crystals.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A device for controlled assembly of colloidal particles, comprising:
   an electrically conductive material;
   a medium comprising a plurality of colloidal particles having a charged surface, wherein the medium is in contact with the electrically conductive material; and
   an external light source that directs light towards the electrically conductive material, wherein in the absence of light, the plurality of colloidal particles is in a first non-assembled state and when the external light source is activated to generate the light, the plurality of colloidal particles is reversibly driven into a second assembled state, wherein the device has no external electric fields or external magnetic fields.

2. The device of claim 1, wherein the medium comprises a solvent selected from the group consisting of: cyclohexyl-bromide (CHB), decahydronaphthalene (decalin), dimethyl sulfoxide (DMSO), water, and combinations thereof.

3. The device of claim 1, wherein the medium has a dielectric constant of less than about 80.

4. The device of claim 1, wherein the medium has a dielectric constant of greater than or equal to about 2 to less than or equal to about 50.

5. The device of claim 1, wherein the medium comprises an electrolyte.

6. The device of claim 1, wherein the medium comprises tetrabutylammonium bromide (TBAB).

7. The device of claim 1, wherein the charged surface of the colloidal particle has a $\zeta$-potential of greater than or equal to about −100 mV to less than or equal to about 100 mV.

8. The device of claim 1, wherein the light has a wavelength of greater than or equal to about 10 nm to less or equal to about 561 nm.

9. The device of claim 1, wherein the plurality of colloidal particles comprises a colloidal particle selected from the group consisting of: polymeric colloidal particles, inorganic colloidal particles, metal colloidal particles, semiconductor colloidal particles, ceramic colloidal particles, and combinations thereof.

10. The device of claim 1, wherein the plurality of colloidal particles comprises a colloidal particle selected from the group consisting of: polystyrene, poly(methyl methacrylate), silica ($SiO_2$), and combinations thereof.

11. The device of claim 1, wherein the plurality of colloidal particles is functionalized with a stabilizer selected from the group consisting of: poly(12-hydroxystearic acid) (PHSA), polydimethylsiloxane (PDMS), diphenyldimethylsiloxane (DPDMS), and combinations thereof.

12. The device of claim 1, wherein the plurality of colloidal particles comprises a poly(methyl methacrylate) colloidal particle and the medium comprises a solvent selected from the group consisting of: cyclohexyl-bromide (CHB), decahydronaphthalene (decalin), and combinations thereof.

13. The device of claim 1, wherein the plurality of colloidal particles comprises a polystyrene colloidal particle and the medium comprises a solvent selected from the group consisting of: dimethyl sulfoxide (DMSO), water, and combinations thereof.

14. The device of claim 1, wherein the second assembled state forms an organized array of the plurality of colloidal particles defining colloidal crystals having uniform structural and photonic properties.

15. A method for making a device for controlled assembly of colloidal particles, the method comprising:
   disposing a medium comprising a plurality of colloidal particles having a charged surface, in contact with an electrically conductive material capable of receiving light from an external light source to form the device, wherein the plurality of colloidal particles in the device can be reversibly driven from a first non-assembled state to a second assembled state when the light is activated from the external light source and directed to the electrically conductive material, wherein a transition from the first non-assembled state to the second assembled state is reversible and occurs without any external electric fields or external magnetic fields.

16. The method of claim 15, wherein the light has a wavelength of greater than or equal to about 10 nm to less or equal to about 561 nm.

17. The method of claim 15, wherein in the second assembled state, a first region and a second region are formed, wherein the first region is concentrated with the plurality of colloidal particles, wherein a boundary between the first region and the second region is less than or equal to about 100 nm.

18. The method of claim 15, wherein in the second assembled state, a first region and a second region are formed, wherein the first region is substantially depleted of the plurality of colloidal particles, wherein a boundary between the first region and the second region is less than or equal to about 100 nm.

19. The method of claim 15, wherein the transition from the first non-assembled state to the second assembled state after the light is first introduced takes less than or equal to about 90 seconds.

20. The method of claim 15, wherein in the second assembled state, the plurality of colloidal particles forms a three-dimensional colloidal crystal array controlled by the application of the light from the external light source.

21. A method of making a device for controlled assembly of colloidal particles, comprising:
disposing a medium comprising a plurality of colloidal particles having a charged surface in contact with an electrically conductive material to create the device, wherein the medium has a dielectric constant of less than about 80 and the charged surface of the colloidal particle has a ζ-potential of greater than or equal to about −100 mV to less than or equal to about 100 mV, wherein the device is configured to receive light from an external light source, so that in the absence of the light, the plurality of colloidal particles is in a first non-assembled state and in the presence of the light, the plurality of colloidal particles is reversibly driven into a second assembled state, where the device has no external electric fields or external magnetic fields.

22. The method of claim 21, wherein the charged surface of the colloidal particle has a ζ-potential of greater than or equal to about −20 mV to less than or equal to about 20 mV.

23. The method of claim 21, wherein the medium comprises a solvent selected from the group consisting of: cyclohexyl-bromide (CHB), decahydronaphthalene (decalin), dimethyl sulfoxide (DMSO), water, and combinations thereof, the plurality of colloidal particles comprises a colloidal particle selected from the group consisting of: polystyrene, poly(methyl methacrylate), silica ($SiO_2$), and combinations thereof, and the electrically conductive material comprises indium-tin-oxide (ITO).

* * * * *